(12) United States Patent
Lanier

(10) Patent No.: US 8,110,262 B2
(45) Date of Patent: Feb. 7, 2012

(54) POLYMER COMPOSITIONS CONTAINING A POLYMER PROCESSING AID AND A HINDERED AMINE LIGHT STABILIZER

(75) Inventor: Elizabeth M. Lanier, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 647 days.

(21) Appl. No.: 12/267,680

(22) Filed: Nov. 10, 2008

(65) Prior Publication Data
US 2010/0119751 A1    May 13, 2010

(51) Int. Cl.
B29D 22/00 (2006.01)
B29D 23/00 (2006.01)
B32B 1/08 (2006.01)

(52) U.S. Cl. ......... 428/35.7; 428/500; 524/102; 524/99; 524/97; 524/236; 526/263; 526/265

(58) Field of Classification Search .................. 428/35.7, 428/500; 524/102, 99, 97, 236; 526/263, 526/265
See application file for complete search history.

(56) References Cited

U.S. PATENT DOCUMENTS

| | | | |
|---|---|---|---|
| 5,798,427 A * | 8/1998 | Foster et al. | 526/352 |
| 5,830,947 A | 11/1998 | Blong et al. | |
| 6,670,412 B1 | 12/2003 | Erderly | |
| 6,680,351 B1 | 1/2004 | Russell et al. | |
| 7,026,494 B1 | 4/2006 | Yang et al. | |
| 7,157,511 B2 | 1/2007 | Bobsein et al. | |
| 7,179,854 B2 | 2/2007 | Russell et al. | |
| 2006/0025504 A1 | 2/2006 | Oriani | |
| 2007/0100047 A1 | 5/2007 | Sukhadia et al. | |

FOREIGN PATENT DOCUMENTS

| | | |
|---|---|---|
| CA | 2176057 | 11/1997 |
| EP | 0342896 | 11/1989 |
| WO | WO 02/00783 | 1/2002 |

OTHER PUBLICATIONS

Basf, Uvinul Techanical Data Sheet, Jul. 1999, pp. 1-7.*
Search Report for International Patent Application PCT/US2009/006029.
Johnson, B., et al, "The Influence of Polyolefin Additives on the Performance of Fluorocarbon Elastomer Process Aids," ANTEC 88, Society of Plastics Engineers 46th Annual Technical Conference & Exhibits, Atlanta, GA, Apr. 18-21, 1988, pp. 1425-1429.
Glaser et al, "Light Stabilisation and More," Kunststoffe plast Europe Sep. 2005, pp. 1-5.

(Continued)

Primary Examiner — Michael C Miggins
(74) Attorney, Agent, or Firm — Merchant & Gould P.C.

(57) ABSTRACT

The present invention provides polyolefin compositions containing a polyolefin resin, a hindered amine light stabilizer, and a polymer processing aid. Methods for preparing the polymer compositions, methods for using the compositions to produce articles of manufacture, and the articles produced from these polyolefin compositions are also provided.

35 Claims, 7 Drawing Sheets

OTHER PUBLICATIONS

Woods et al, "The Influence of Polymer Process Additives (PPAs) and Hindered Amine Light Stabilizer (HALS) Combinations in LLDPE Blown Film—Part IIA," No. 28, Dynamar Polymer Processing Additives, Technical Information and Test Data. Jul. 2001, 8 pgs.

King et al, "The Influence of Polymer Process Additives (PPAs) and Hindered Amine Light Stabilizer (HALS) Combinations in LLDPE Blown Film Applications—Part IIb," No. 29, Dynamar Polymer Processing Additives, Technical Information and Test Data, Aug. 2001, 15 pgs.

Uvinol Light Stabilizers, BASF The Chemical Company, Technical information, EVP 004605 e, Sep. 2007, 18 pgs.

Uvinul 5050H, Full Public Report, National Industrial Chemicals Notification & Assessment Scheme, File No. NA/517, Jan. 1998, 15 pgs.

VITON FreeFlow Z200, DuPont Performance Elastomers LLC Material Safety Data Sheet, Nov. 9, 2005, 11 pgs.

Cyasorb UV-3529, Full Public Report, National Industrial Chemicals Notification & Assessment Scheme, File No. NA-686, Jun. 1999, 35 pgs.

Glaser et al, "Interaction of HALS with Fluoroelastomers in M-LLDPE Films," Proceedings of the $3^{rd}$ European Additives & Colors Conference, Feb. 19-20, 2003, pp. 25-28.

* cited by examiner

POLYMER COMPOSITIONS CONTAINING A POLYMER PROCESSING AID AND A HINDERED AMINE LIGHT STABILIZER

BACKGROUND OF THE INVENTION

The present invention relates generally to polyolefin resin compositions containing a hindered amine light stabilizer (HALS) additive. A HALS additive can be used to prolong the stability of a polymer, or an article produced from the polymer, during exposure to sunlight and ultraviolet (UV) radiation.

These polyolefin compositions also can contain a polymer processing aid (PPA) additive to reduce or eliminate melt fracture. Melt fracture is a flow instability of a polymer during processing which often manifests as a sharkskin or orange-peel appearance on the surface of an article produced from the polymer. Melt fracture is generally more problematic with linear polyolefins having higher molecular weights or narrower molecular weight distributions, and during melt processing via narrow die gaps, at lower processing or melt temperatures, or at higher output or production rates.

PPA additives are used to improve the melt processing of polyolefins, for instance, to reduce or eliminate melt fracture. Generally, a PPA additive coats the metal surface that the polymer is in contact with during melt processing, for example, during extrusion through a metal die. By coating the metal surface of the die, the PPA additive can reduce the extrusion pressure and the shear stress on the polymer at the metal interface, resulting in a fabricated article with a smooth surface.

The ability of a PPA additive to reduce or eliminate melt fracture can be adversely affected by the presence of other additives. For instance, the addition of both a HALS additive and a PPA additive has a negative, or antagonistic, effect on melt fracture. See e.g., B. V. Johnson and J. M. Kunde, "The Influence of Polyolefin Additives on the Performance of Fluorocarbon Elastomer Process Aids," Society of Plastics Engineers Annual Technical Conference (ANTEC) Proceedings, April 18-21, Atlanta, Ga. (1988). More specifically, additional PPA is needed to eliminate melt fracture than that required in the absence of a HALS additive, or a longer processing time is needed to completely eliminate melt fracture when a HALS additive is present. Further, the presence of colorants or pigments, such as titanium dioxide, can also have an antagonistic effect on the ability of a PPA to reduce or eliminate melt fracture.

Therefore, there is a need in the polymer industry for a polyolefin composition containing a HALS additive and a PPA additive which has improved resistance to melt fracture. Such a composition can contain both a HALS and a PPA additive, but beneficially, where the HALS additive does not negatively impact the ability of the processing aid to eliminate melt fracture during extrusion or other melt processing operation. Accordingly, it is to these ends that the present invention is directed.

SUMMARY OF THE INVENTION

The present invention discloses polymer resin compositions, methods for preparing the polymer compositions, methods for using the compositions to produce articles, and the articles produced from these polymer compositions. Specifically, the present invention discloses polyolefin compositions containing a polymer processing aid (PPA) additive and a hindered amine light stabilizer (HALS) additive. These polyolefin compositions have improved resistance to melt fracture. In accordance with the present invention, one such composition comprises:

(i) a polyolefin having a weight-average molecular weight (Mw) from about 175,000 to about 500,000 and a polydispersity index (Mw/Mn) from about 5 to about 40;
(ii) about 200 to about 1500 ppm of a polymer processing aid (PPA); and
(iii) about 500 to about 3000 ppm of an oligomeric hindered amine light stabilizer (HALS) having the following structure:

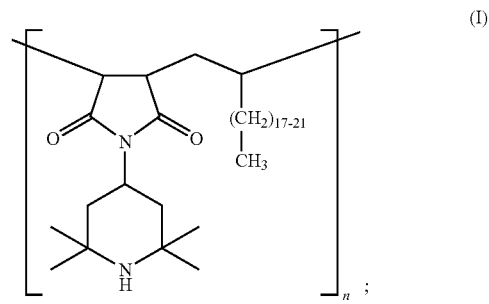

(I)

wherein n is an integer such that the oligomeric HALS has a number-average molecular weight (Mn) in a range from about 3000 to about 4000.

Articles of manufacture, which are produced from polyolefin compositions, are provided in another aspect of this invention. For example, an article selected from a pipe and a tape can comprise:

(i) a polyolefin having a weight-average molecular weight (Mw) from about 175,000 to about 500,000 and a polydispersity index (Mw/Mn) from 5 to about 40;
(ii) about 100 to about 1500 ppm of a polymer processing aid (PPA); and
(iii) about 500 to about 3000 ppm of the oligomeric HALS of formula (I), wherein n is an integer as defined above.

Methods for producing articles of manufacture from polyolefin compositions are also provided in the present invention. These methods can reduce or eliminate melt fracture during the melt processing of a polyolefin. A method for producing an article from a polyolefin composition in accordance with another aspect of this invention comprises:

(a) providing a polyolefin composition comprising (i) a polyolefin having a weight-average molecular weight (Mw) from about 175,000 to about 500,000 and a polydispersity index (Mw/Mn) from about 5 to about 40; (ii) about 200 to about 1500 ppm of a polymer processing aid (PPA); and (iii) about 500 to about 3000 ppm of an oligomeric hindered amine light stabilizer (HALS) having the following structure:

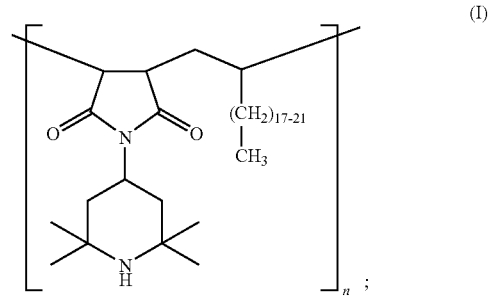

(I)

wherein n is an integer such that the oligomeric HALS has a number-average molecular weight (Mn) in a range from about 3000 to about 4000; and (b) melt processing the polyolefin composition through a die at a shear rate of less than about 50 sec$^{-1}$ to produce the article.

Yet, in another aspect, a method for producing an article from a polyolefin composition is provided which does not require the presence of a polymer processing aid (PPA). This method comprises:

(a) providing a polyolefin composition comprising (i) a polyolefin having a weight-average molecular weight (Mw) from about 175,000 to about 500,000 and a polydispersity index (Mw/Mn) from about 5 to about 40; and (ii) about 500 to about 3000 ppm of the oligomeric HALS of formula (I), wherein n is an integer as defined above; and (b) melt processing the polyolefin composition through a die at a shear rate of less than about 50 sec$^{-1}$ to produce the article.

DEFINITIONS

Figure 1:
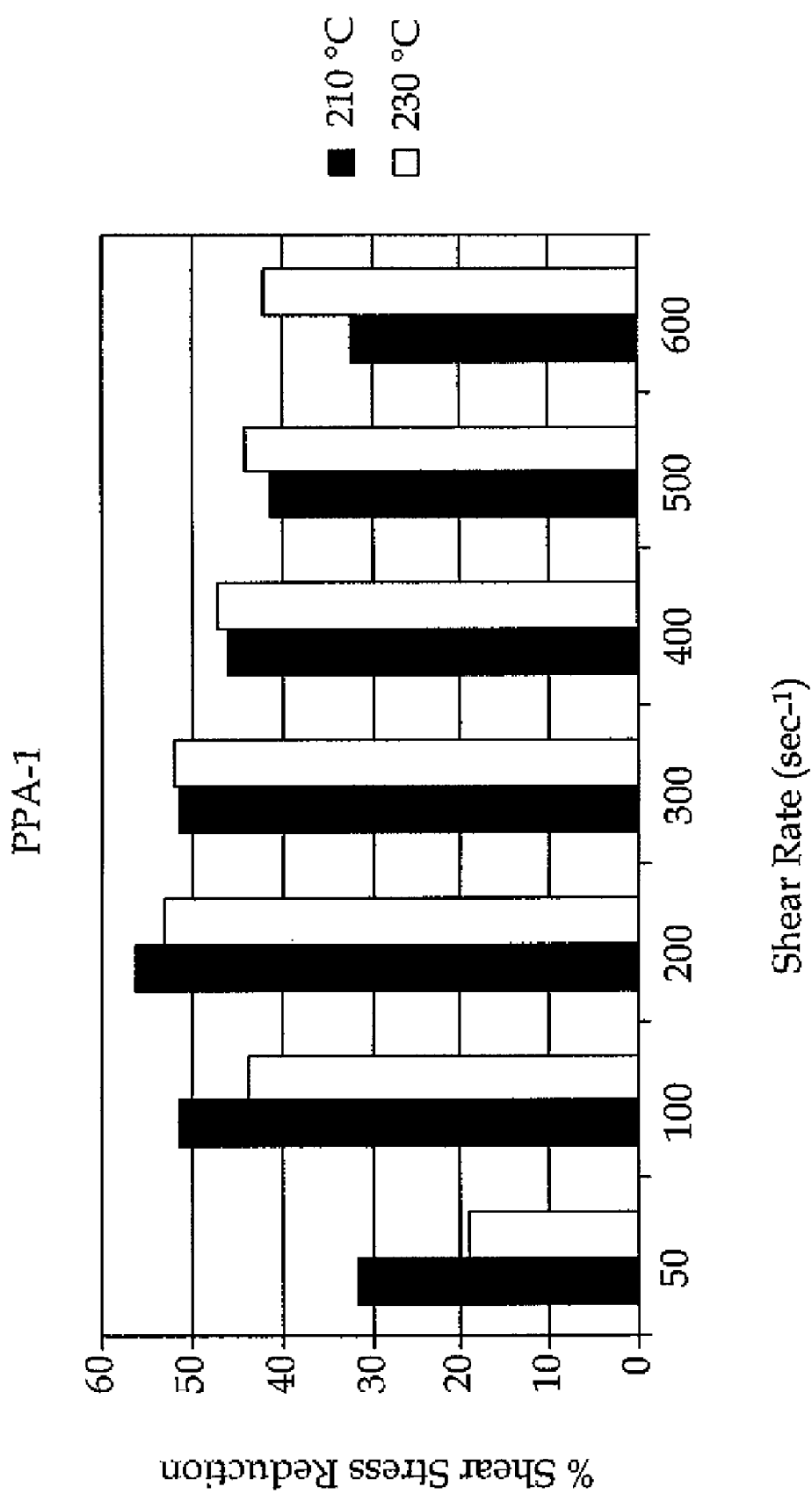
FIG. 1 presents a plot of shear stress reduction due to the addition of PPA-1 as a function of shear rate and temperature for RESIN-1.

To define more clearly the terms used herein, the following definitions are provided. To the extent that any definition or usage provided by any document incorporated herein by reference conflicts with the definition or usage provided herein, the definition or usage provided herein controls.

The terms "polymer," "polymer resin," "polyolefin," "polyolefin resin," and the like, are used herein to encompass any homopolymer of an olefin monomer, copolymer of an olefin monomer with a comonomer, or terpolymer of an olefin monomer with two or more comonomers. For example, this includes ethylene homopolymers and copolymers of ethylene and a comonomer. This also includes homopolymers, copolymers, terpolymers, etc., of any other olefin monomer disclosed herein (e.g., propylene).

The term "ppm," an abbreviation for "parts per million," is used herein when reciting the weight percent of certain additives in a polyolefin composition, and is based on the weight of the polyolefin present in the polyolefin composition. For instance, 1000 ppm equates to 0.1 weight percent. Likewise, "ppm" is used herein when reciting the weight percent of certain additives in an article of manufacture, and is based on the weight of the polyolefin present in the article of manufacture. If more than one polyolefin is present in the polyolefin composition or in the article (e.g., a blend of two or more polyolefins), the amount in ppm is based on the total polyolefin content.

As used herein, the term "no melt fracture," or alternatively, in the absence of melt fracture or free from melt fracture, means that the surface of the article produced from the polyolefin composition contains no visible sharkskin or orange peel surface defects which are characteristic of melt fracture. Additionally, "substantially no melt fracture," or alternatively, in the substantial absence of melt fracture or substantially free of melt fracture, means that less than 10% of the perimeter of the article produced from the polyolefin composition contains any visible sharkskin or orange peel surface defects which are characteristic of melt fracture.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any structure presented also encompasses all conformational isomers, regioisomers, and stereoisomers that may arise from a particular set of substituents. The structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of integers, a range of molecular weight (e.g., weight-average, number-average), a range of polydispersity index, a range of melt index, a range of high load melt index, a range of density, a range of zero-shear viscosity, a range of shear rate, a range of temperature, a range of comonomer content, a ppm range of PPA, a ppm range of HALS, a ppm range of other additives, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, by a disclosure that a HALS additive is present in a range from about 500 ppm to about 3000 ppm, Applicants' intend to recite that the ppm of the HALS additive can be selected from about 500, about 600, about 700, about 800, about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, or about 3000. Additionally, the ppm content of the HALS additive can be within any range from about 500 ppm to about 3000 ppm (for example, about 750 ppm to about 1500 ppm of the HALS additive), and this also includes any combination of ranges between about 500 ppm and about 3000 ppm (for example, about 500 ppm to about 1000 ppm, and about 1500 ppm to about 2000 ppm). Likewise, all other ranges disclosed herein should be interpreted in a manner similar to this example.

Applicants reserve the right to proviso out or exclude any individual members of any such range, including any sub-ranges or combinations of sub-ranges within the stated range, that can be claimed according to a range or in any similar manner, if for any reason Applicants choose to claim less than the fill measure of the disclosure, for example, to account for a reference that Applicants may be unaware of at the time of the filing of the application.

While compositions, articles, and methods are described in terms of "comprising" various components or steps, these compositions, articles, and methods can also "consist essentially of" or "consist of" the various components or steps.

DETAILED DESCRIPTION OF THE INVENTION

The present invention is directed generally to polyolefin resin compositions, methods for preparing the resin compositions, methods for using the compositions to produce articles, and the articles produced from these polyolefin resin compositions. In particular, the present invention relates to polyolefin compositions which contain a polymer processing aid (PPA) additive and a hindered amine light stabilizer (HALS) additive. Such compositions can have either reduced melt fracture or no melt fracture during melt processing operations. According to one aspect of this invention, a polyolefin composition comprises:

(i) a polyolefin having a weight-average molecular weight (Mw) from about 175,000 to about 500,000 and a polydispersity index (Mw/Mn) from about 5 to about 40;

(ii) about 200 to about 1500 ppm of a polymer processing aid (PPA); and (iii) about 500 to about 3000 ppm of an oligomeric hindered amine light stabilizer (HALS) having the following structure:

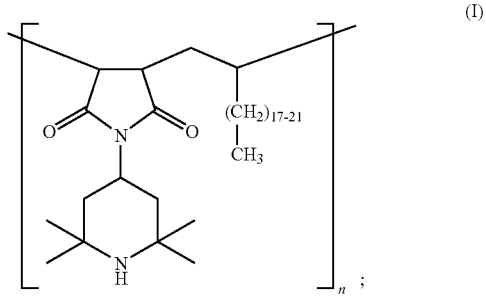

wherein n is an integer such that the oligomeric HALS has a number-average molecular weight (Mn) in a range from about 3000 to about 4000. Various articles of manufacture can be produced from the polyolefin composition, including, for instance, pipes, films, sheets or tapes, molded products, and the like.

In another aspect, polyolefin compositions of the present invention have either no melt fracture, or substantially no melt fracture, when melt processed at a shear rate of less than about 50 sec$^{-1}$. For example, polyolefin compositions of the present invention can have either no melt fracture, or substantially no melt fracture, when melt processed at a shear rate in a range from about 0.1 sec$^{-1}$ to about 40 sec$^{-1}$, or alternatively, at a shear rate in a range from about 1 sec$^{-1}$ to about 30 sec$^{-1}$.

According to another aspect of this invention, an article selected from a pipe and a tape is provided. This article comprises:

(i) a polyolefin having a weight-average molecular weight (Mw) from about 175,000 to about 500,000 and a polydispersity index (Mw/Mn) from about 5 to about 40;

(ii) about 100 to about 1500 ppm of a polymer processing aid (PPA); and (iii) about 500 to about 3000 ppm of an oligomeric hindered amine light stabilizer (HALS) having the following structure:

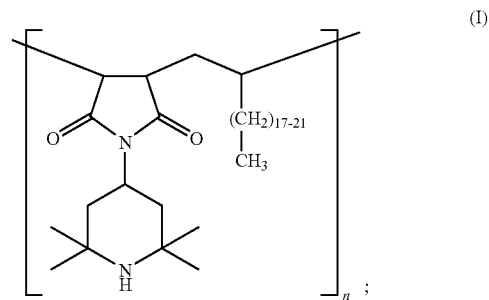

wherein n is an integer such that the oligomeric HALS has a number-average molecular weight (Mn) in a range from about 3000 to about 4000. This article, whether a pipe or a tape, generally has either no melt fracture or substantially no melt fracture.

Polyolefin Resins

Generally, the polyolefin employed in polyolefin compositions and articles of the present invention can be any homopolymer of an olefin monomer, copolymer of an olefin monomer with a comonomer, terpolymer of an olefin monomer with two or more comonomers, and so forth. One or more than one polyolefin can be used in the polyolefin composition or article, such as, for example, blends or mixtures of two polyolefin resins. The olefin monomer or comonomer can have from 2 to 30 carbon atoms and have at least one olefinic double bond. For example, this invention encompasses homopolymers using a single olefin such as ethylene or propylene, as well as copolymers and terpolymers with at least one different olefinic compound. An ethylene copolymer generally contains a major amount of ethylene (>50 mole percent) and a minor amount of comonomer (<50 mole percent), though this is not a requirement. The comonomers that can be copolymerized with ethylene will often have from 3 to 20 carbon atoms in their molecular chain.

Polymers derived from acyclic, cyclic, polycyclic, terminal (α), internal, linear, branched, substituted, unsubstituted, functionalized, and non-functionalized olefins can be employed in this invention. For example, typical unsaturated compounds that can be polymerized to produce homopolymers and copolymers useful in the present invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and the like, or mixtures of two or more of these compounds. Cyclic and bicyclic olefins, including but not limited to, cyclopentene, cyclohexene, norbornylene, norbornadiene, and the like, can also be polymerized. Styrene can also be employed as a monomer in the present invention.

When a copolymer is desired, the monomer can be, for example, ethylene or propylene, which is copolymerized with a comonomer. Examples of olefin comonomers include, but are not limited to, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, and the like. According to one aspect of the present invention, when ethylene is the monomer, the comonomer can be propylene, 1-butene, 1-pentene, 1-hexene, 1-octene, 1-decene, styrene, and the like, or any combination thereof. In some aspects of this invention, the polyolefin is an ethylene homopolymer, and no comonomer is present. In other aspects, the polyolefin resin is an ethylene copolymer. Further, when the polyolefin is an ethylene copolymer, the comonomer can be 1-butene, 1-hexene, or 1-octene, for example, or any combination thereof.

For copolymers, the amount of comonomer introduced into a reactor zone to produce the copolymer is generally from about 0.01 to about 45 weight percent of the comonomer based on the total weight of the monomer and comonomer. According to another aspect of the present invention, the amount of comonomer introduced into a reactor zone is from about 0.01 to about 40, from about 0.05 to about 30, or from about 0.1 to about 25, weight percent comonomer based on the total weight of the monomer and comonomer. In still another aspect, the amount of comonomer introduced into a reactor zone is from about 0.5 to about 20 weight percent comonomer based on the total weight of the monomer and comonomer. Yet, in another aspect the amount of comonomer introduced into a reactor zone is from about 1 to about 10 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one monomer is ethylene, so the polymerizations are either a homopolymerization involving only ethylene, or copolymerizations with a different acyclic, cyclic, terminal, internal, linear, branched, substituted, or unsubstituted olefin. In addition, polyolefins formed from the polymerization of diolefin compounds including, but not limited to, 1,3-butadiene, isoprene, 1,4-pentadiene, 1,5-hexadiene, and the like, can be used in the present invention.

Polymer resins useful in the present invention can be produced using any suitable catalyst system. These catalyst systems can include metallocene, Ziegler-Natta, chromium, and the like, or combinations thereof. Dual catalyst systems containing, for example, more than one metallocene compound, or a metallocene compound and a Ziegler-Natta catalyst compound, can be used to produce polyolefins which can be employed in the present invention.

The polyolefin resin can be produced using various types of polymerization reactors, such as batch, slurry, gas phase, solution, high pressure, tubular, and autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of unreacted monomer, unreacted comonomer, and/or diluent.

Polymerization reactor systems useful in the present invention may comprise one type of reactor in a system or multiple reactors of the same or different type. For example, multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series or in parallel. Thus, polyolefins manufactured in accordance with any suitable polymerization process can be used in the present invention.

The polyolefin resin—homopolymer, copolymer, terpolymer, etc.—produced using a particular catalyst system and polymerization reactor can be characterized using a variety of analytical tests. Polymer properties which can be measured include, but are not limited to, melt index, high load melt index, density, weight-average molecular weight (Mw), number-average molecular weight (Mn), molecular weight distribution, melting temperature, glass transition temperature, degree of long chain branching, short chain branching distribution, rheological characterization (e.g., zero-shear viscosity), yield strength, tensile strength, flexural strength, impact strength, and the like.

According to one aspect of this invention, the polyolefin is an ethylene homopolymer or ethylene copolymer. For example, the ethylene copolymer can be an ethylene/1-butene copolymer, an ethylene/1-hexene copolymer, or an ethylene/1-octene copolymer. Blends or combinations of more than one polyolefin resin are contemplated herein and are encompassed by this invention.

Polyolefins which can be employed in this invention generally have a melt index (MI) from about 0.005 to about 100 g/10 min. For example, the melt index can be in a range from about 0.01 to about 50 g/10 min, from about 0.01 to about 25 g/10 min, from about 0.01 to about 10 g/10 min, or from about 0.01 to about 2 g/10 min. In another aspect, the melt index of the polyolefin is in a range from about 0.01 to about 1 g/10 min. Yet, in another aspect, the melt index of the polyolefin is in a range from about 0.01 to about 0.5 g/10 min. Further, the melt index of the polyolefin can be in a range from about 0.01 to about 0.25 g/10 min, or from about 0.01 to about 0.1 g/10 min, in other aspects of this invention.

Likewise, polyolefins of the present invention, including homopolymers and copolymers of ethylene, can have a high load melt index (HLMI) from about 0.5 to about 150 g/10 min, such as, for example, from about 0.5 to about 100 g/10 min, from about 0.5 to about 75 g/10 min, or from about 1 to about 50 g/10 min. In another aspect, the HLMI of the polyolefin is in a range from about 1 to about 25 g/10 min. In yet another aspect, the HLMI of the polyolefin is in a range from about 1 to about 20 g/10 min, from about 1 to about 15 g/10 min, or from about 1 to about 10 g/10 min. Polyolefins having HLMI values in a range from about 1 to about 8 g/10 min, or from about 2 to about 7 g/10 min, can be employed in other aspects of this invention.

The densities of ethylene-based homopolymers and copolymers, and the like, employed in the present invention typically fall within a range from about 0.88 to about 0.97 g/cm$^3$. In one aspect of this invention, the polymer density is in a range from about 0.91 to about 0.96 g/cm$^3$, from about 0.92 to about 0.96 g/cm$^3$, or from about 0.93 to about 0.96 g/cm$^3$. In another aspect, the density of the ethylene polymer is in a range from about 0.935 to about 0.955 g/cm$^3$. In a further aspect, the polymer density is in a narrower range from about 0.94 to about 0.955 g/cm³, for example, in a range from about 0.945 to about 0.955 g/cm³.

It is contemplated that polyolefins having a weight-average molecular weight (Mw) in a range from about 175,000 to about 500,000 can be used in the present invention. For example, the Mw of the polyolefin can be within a range from about 175,000 to about 450,000, from about 185,000 to about 400,000, or from about 190,000 to about 350,000. In another aspect, the polyolefin resin can have a Mw that is within a range from about 200,000 to about 300,000. Molecular weights disclosed herein are provided in units of g/mol.

The number-average molecular weight (Mn) of the polyolefin is generally within a range from about 5,000 to about 100,000. In some aspects of the present invention, the Mn of the polyolefin resin is within a range from about 5,000 to about 75,000, from about 5,500 to about 50,000, or from about 6,000 to about 35,000. Yet, the Mn of the polyolefin can be in a range from about 6,000 to about 20,000, or from about 7,000 to about 15,000, in other aspects of this invention.

Polydispersity index is a measure of the molecular weight distribution of a polymer and is defined as the ratio, Mw/Mn. Generally, the polydispersity index (Mw/Mn) of the polyolefin of the present invention is in a range from about 5 to about 40. Alternatively, the polydispersity index of the polyolefin can be within a range from about 7 to about 40, from about 10 to about 35, or from about 15 to about 35. In another aspect, the polydispersity index of the polyolefin is in a range from about 20 to about 30.

The viscosity of the polymer over a range of shear rates can be used to determine the flow characteristics of the polymer, at a given temperature. The zero-shear viscosity of the polyolefin at 190° C. can be in a range from about 25,000 to about 500,000 Pa·s, for example, from about 50,000 to about 500,000 Pa·s. In another aspect, the zero-shear viscosity of the polyolefin at 190° C. is in a range from about 70,000 to about 400,000 Pa·s, from about 85,000 to about 300,000 Pa·s, or from about 100,000 to about 200,000 Pa·s.

The following polyolefin resins were employed in the examples that follow and were produced by Chevron Phillips Chemical Company LP:

RESIN 1—ethylene/α-olefin copolymer having a nominal melt index of 1.4 g/10 min, high load melt index of 28 g/10 min, density of 0.916 g/cm³, Mw of 108,000, Mn of 49,000, polydispersity index (Mw/Mn) of 2.2, and zero-shear viscosity at 190° C. of 4000 Pa·s.

RESIN 2—ethylene/α-olefin copolymer having a nominal melt index of 1 g/10 min, high load melt index of 29 g/10 min, density of 0.918 g/cm³, Mw of 137,000, Mn of 30,000, polydispersity index (Mw/Mn) of 4.5, and zero-shear viscosity at 190° C. of 11,000 Pa·s.

RESIN 3—ethylene/α-olefin copolymer having a nominal melt index of 0.07 g/10 min, high load melt index of 3.4 g/10 min, density of 0.95 g/cm³, Mw of 250,000, Mn of 10,500, polydispersity index (Mw/Mn) of 24, and zero-shear viscosity at 190° C. of 157,000 Pa·s.

RESIN 4—ethylene/α-olefin copolymer having a nominal melt index of 0.075 g/10 min, high load melt index of 3 g/10 min, density of 0.949 g/cm³, Mw of 234,000, Mn of 8,500, polydispersity index (Mw/Mn) of 27.5, and zero-shear viscosity at 190° C. of 136,000 Pa·s.

Hindered Amine Light Stabilizer (HALS)

Polyolefin compositions of this invention, and articles of manufacture derived from these compositions, contain a hindered amine light stabilizer (HALS), specifically, an oligomeric HALS having the following structure:

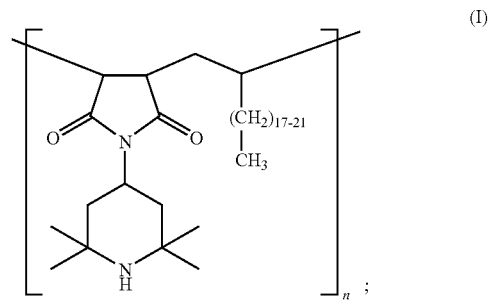

wherein n is an integer such that the oligomeric HALS has a number-average molecular weight (Mn) in a range from about 3000 to about 4000. The oligomeric HALS material of formula (I) is also referred to as HALS-3 in this disclosure. HALS-3, and other HALS additives, can be used to prolong the stability of a polymer, or an article produced from the polymer, during exposure to sunlight and UV radiation. The loading of a HALS additive in a polyolefin composition, and an article derived from the composition, can vary depending upon several factors, including the type of polymer resin, the thickness of the article, the environmental conditions that the article is to be subjected, the desired lifetime of the article, the presence of other additives, the material costs, and so forth. Generally, the loading of the oligomeric HALS of formula (I) in a polyolefin composition or an article of manufacture ranges from about 100 ppm to about 5000 ppm, based on the weight of the polyolefin in the polyolefin composition or the article, respectively. For example, the oligomeric HALS of formula (I) can be present in a polyolefin composition, or an article produced from the polyolefin composition, in an amount within a range from about 500 ppm to about 3000 ppm. In other aspects of this invention, the oligomeric HALS of formula (I) is present in an amount within a range from about 750 ppm to about 3000 ppm, or from about 1000 ppm to about 3000 ppm, based on the weight of the polyolefin.

The polyolefin composition can contain more than one light stabilizer, or additionally, can contain an UV absorber. For instance, the polyolefin composition or article can contain HALS-3 and a second, different, HALS additive. Alternatively, the polyolefin composition or article can contain HALS-3 and an UV absorber. UV absorbers can include, but are not limited to, benzotriazole compounds, benzophenone compounds, esters of benzoic acids, acrylates, nickel compounds, oxalic acid diamides, and the like, or combinations thereof.

For example, 2-(2'-hydroxyphenyl)-benzotriazoles, such as the 5'-methyl-, 3',5'-di-t-butyl-, 5'-t-butyl-, 5'-(1,1,3,3-tetramethylbutyl)-, 5-chloro-3'-, 5'-di-t-butyl-, 5-chloro-3'-t-butyl-5'-methyl-, 3'-sec-butyl-5'-t-butyl, 4'-octoxy, 3',5'-di-t-amyl-, and 3',5'-bis-(α,α-dimethylbenzyl)-derivatives, are suitable benzotriazole compounds. Illustrative benzophenone compounds include 2-hydroxy-benzophenones, such as the 4-hydroxy-, 4-methoxy-, -octoxy-, 4-decyloxy-, 4-dodecyloxy-, 4-benzyloxy-, 4,2',4'-trihydroxy-, and 2'-hydroxy-4,4'-dimethoxy-derivatives. Non-limiting examples of esters of substituted and unsubstituted benzoic acids are phenyl salicylate, 4-t-butyl-phenyl-salicylate, octylphenyl salicylate, dibenzoyl-resorcinol, bis-(4-t-butylbenzoyl)-resorcinol, benzoylresorcinol, 2,4-di-t-butyl-phenyl-3,5-di-t-butyl-4-hydroxybenzoate, and hexadecyl-3,5-di-t-butyl-4-hydroxybenzoate. Suitable acrylate compounds include, for example, α-cyano-β,β-diphenylacrylic acid ethyl ester or isooctyl ester, α-carbomethoxy-cinnamic acid methyl ester, α-cyano- β-methyl-p-methoxy-cinnamic acid methyl ester or butyl ester, α-carbomethoxy-p-methoxy-cinnamic acid methyl ester, and N-(β-carbomethoxy-β-cyano-vinyl)-2-methyl-indoline. Illustrative nickel compounds are nickel complexes of 2,2'-thio-bis-[4-(1,1,3,3-tetramethylbutyl)-phenol], such as the 1:1 or 1:2 complex, optionally with additional ligands such as n-butylamine, triethanolamine, or N-cyclohexyl-diethanolamine, nickel dibutyl-dithiocarbamate, nickel salts of 4-hydroxy-3,5-di-t-butylbenzylphosphonic acid monoalkyl esters, such as of the methyl, ethyl or butyl ester, nickel complexes of ketoximes such as of 2-hydroxy-4-methyl-phenyl undecyl ketoxime, and nickel complexes of 1-phenyl-4-lauroyl-5-hydroxy-pyrazol, optionally with additional ligands. Oxalic acid diamides include 4,4'-di-octyloxy-oxanilide, 2,2'-di-octyloxy-5,5-di-t-butyl-oxanilide, 2,2'-di-dodecyloxy-5,5'-di-t-butyl-oxanilide, 2-ethoxy-2'-ethyl-oxanilide, N,N'-bis(3-dimethylaminopropyl)-oxalamide, 2-ethoxy-5-t-butyl-2'-ethoxyanilide and its mixture with 2-ethoxy-2'-ethyl-5,4'-di-t-butyloxanilide, and mixtures of o-methoxy and p-methoxy as well as of o-ethoxy and p-ethoxy disubstituted oxanilides.

The following HALS additives were evaluated in the examples that follow:

HALS-1—commercially available from Cytec Industries as Cyasorb UV-3529, which is 1,6-hexanediamine, N,N'-bis(2,2,6,6-tetramethyl-4-piperidinyl)-, polymers with morpholine-2,4,6-trichloro-1,3,5-triazine reaction products, methylated; the CAS Number is 193098-40-7.

HALS-2—commercially available from Ciba Specialty Chemicals as Chimassorb 944, which is poly[[6-[(1,1,3,3-tetramethylbutyl)amino]-s-triazine-2,4-diyl][[(2,2,6,6-tetramethyl-4-piperidinyl)imino]hexamethylene [(2,2,6,6-tetramethyl-4-piperidinyl)imino]]; the CAS Number is 70624-18-9.

HALS-3—commercially available from BASF as Uvinul 5050H, which is an oligomeric HALS with the following structure:

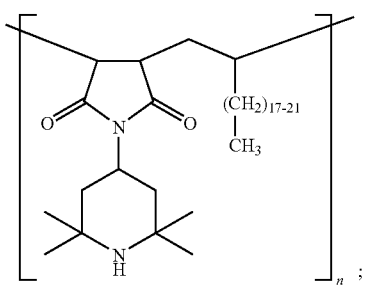

and n is an integer such that the oligomeric HALS-3 has a number-average molecular weight (Mn) in a range from about 3000 to about 4000; the CAS Number is 152261-33-1. Other nomenclature which can used to describe HALS-3 include an alpha alkene ($C_{20}$-$C_{24}$) polymer/oligomer with maleic anhydride reaction products with 2,2,6,6-tetramethyl-4-piperidinamine, or a polymer/oligomer of 2,2,6,6-tetramethyl-piperidin-4-amine, maleic anhydride, and $C_{20}$-$C_{24}$ alkenes.

HALS-4—commercially available from Cytec Industries as Cyasorb THT 4802, which is a proprietary blend containing 60-95% percent of CAS Number 193098-40-7.

HALS-5—commercially available from Clariant as Hostavin N30, which is a polymer of 2,2,4,4-tetramethyl-7-oxa-3,20-diazadispiro-(5.1.11.2)-heneicosan-21-one and epichlorohydrin; the CAS Number is 202483-55-4.

HALS-6—commercially available from Ciba Specialty Chemicals as Chimassorb 2020, which is 1,6-hexanediamine, N,N'-bis(2,2,6,6-tetramethyl-4-piperidinyl)-polymer with -2,4,6 trichloro-1,3,5-triazine, reaction products with N-butyl-1-butanamine and N-butyl-2,2,6,6-tetramethyl-4-piperidinamine; the CAS Number is 192268-64-7.

HALS-7—commercially available from Chemtura as Lowilite 94, which is poly[[6-[(1,1,3,3-tetramethylbutyl)amino]-s-triazine-2,4-diyl]][(2,2,6,6-tetramethyl-4-piperidinyl)imino]hexamethylene [(2,2,6,6-tetramethyl-4-piperidinyl)imino]]; the CAS Number is 70624-18-9.

Polymer Processing Aid (PPA)

PPA's are often added to a polymer to improve the processing characteristics of the polymer and to eliminate surface related imperfections that can occur during processing. The benefits of PPA's can include the elimination of melt fracture, lower extrusion pressures and motor loads, and improved die/extruder clean-up. For example, the addition of PPA's to linear low density polyethylene (LLDPE) can help prevent melt fracture, also referred to as sharkskin or orange peel, in an article of manufacture. Melt fracture often appears as a pattern of surface ridges which can be generally perpendicular to the flow direction. Non-limiting examples of PPA additives suitable for use with polyolefin resins of this invention comprise fluoroelastomers and low molecular weight polyethylene waxes, with or without a synergistic agent such as polyethylene glycol or polycaprolactone. Polyolefin compositions of the present invention, and articles produced from these polyolefin compositions, can contain a PPA, but are not limited to any particular PPA additive.

Fluoroelastomers are polymers that contain atoms of fluorine. Fluorinated monomers, which may be copolymerized to yield suitable fluoroelastomers include vinylidene fluoride, hexafluoropropylene, chlorotrifluoroethylene, tetrafluoroethylene, and perfluoroalkyl perfluorovinyl ethers. Specific examples of fluoroelastomers which can be employed in the present invention include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene, and optionally, vinylidene fluoride.

In one aspect, the fluoroelastomer (i) comprises predominantly large particle size fluoroelastomers, for example, a weight-average particle size of from about 2 and about 10 microns; (ii) has a fluid state at room temperature and above, i.e., has a glass transition temperature ($T_g$) below room temperature and exhibits little or no crystallinity at room temperature; (iii) comprises an interfacial agent of a polycaprolactone having a number-average molecular weight in the range of about 1000 to about 32,000 in a weight ratio of polycaprolactone:fluoroelastomer of less than about 5:1; or (iv) combinations thereof. Alternatively, any fluoroelastomer comprising a caprolactone interfacial agent in a weight percent of about 60% can be used in the polyolefin compositions disclosed herein.

In another aspect of the present invention, the PPA comprises a vinylidene fluoride-hexafluoropropylene copolymer, a difluoroethene-tetrafluoroethene-hexafluoropropylene terpolymer, a polyethylene oxide, a polyester polyol, or a combination of more than one of these materials. Additionally, the PPA can further comprise talc, calcium carbonate, or a combination of talc and calcium carbonate. One or more PPA additives can be employed in the polyolefin composition, therefore, combinations of PPA additives are contemplated.

The PPA additive can be present in the polyolefin composition or in the article of manufacture in an amount ranging from about 25 ppm to about 2500 ppm, based on the weight of the polyolefin in the composition or in the article, respectively. For example, the PPA additive, which can contain a fluoroelastomer and other components (e.g., a polyester polyol), can be present in a range from about 50 ppm to about 2000 ppm, from about 75 to about 1750 ppm, from about 100 to about 1500 ppm, or from about 200 to about 1500 ppm, in some aspects of this invention. Yet, in other aspects, the amount of PPA in the polyolefin composition or in the article is in a range from about 400 ppm to about 1500 ppm, or alternatively, from about 600 ppm to about 1500 ppm.

The following PPA's were evaluated in the examples that follow:

PPA-1—commercially available from Dyneon as Dynamar™ FX 9614, and contains 88-92 weight % vinylidene fluoride-hexafluoropropylene copolymer (CAS Number 9011-17-0), 4-10 weight % talc (CAS Number 14807-96-6), 1-5 weight % synthetic amorphous silica, fumed, crystalline free (CAS Number 112945-52-5), and 1-5 weight % calcium carbonate (CAS Number 471-34-1).

PPA-2—commercially available from DuPont as Viton® Freeflow Z200, and contains less than 60 weight % vinylidene fluoride-hexafluoropropene polymer (CAS Number 9011-17-0), greater than 40 weight % polyester polyol (CAS Number 31831-53-5), less than 5 weight % calcium carbonate (CAS Number 1317-65-3), and less than 5 weight % talc (CAS Number 14807-96-6).

PPA-3—commercially available from Dyneon as Dynamar™ FX 5920A, and contains 60-70 weight % polyethylene oxide (CAS Number 25322-68-3), 25-35 weight % vinylidene fluoride-hexafluoropropylene polymer (CAS Number 9011-17-0), 1-6 weight % talc (CAS Number 14807-96-6), and 0-5 weight % calcium carbonate (CAS Number 471-34-1).

PPA-4—commercially available from Dyneon as Dynamar™ FX 5911, and contains 100 weight % HFP (hexafluoropropylene) VDF (vinylidene fluoride) TFE (tetrafluoroethylene) polymer (CAS Number 25190-89-0).

PPA-5—commercially available from Dyneon as Dynamar™ FX 5929, and contains 40-55 weight % polyethylene oxide (CAS Number 25322-68-3), 40-55 weight % vinylidene fluoride-hexafluoropropylene polymer (CAS Number 9011-17-0), 1-8 weight % talc (CAS Number 14807-96-6), 0-5 weight % calcium carbonate (CAS Number 471-34-1), and less than 3 weight % of an undisclosed additive.

Other Additives

Additives are often used in polyolefin compositions to improve the processing or ease of manufacturing of the polyolefin resin and its intended finished article. Another use of additives is to impart a certain property or characteristic to the finished article. In the present invention, the polyolefin composition, and articles of manufacture derived from the polyolefin composition, can further comprise at least one additive, other than the PPA and/or HALS additives noted above. For example, the at least one other additive can be an antioxidant, an acid scavenger, an antiblock additive, a slip additive, a colorant, a filler, or any combination thereof.

Additives are often supplied in the form of a masterbatch. A masterbatch can be described generally as a composition or formulation containing a high loading or high concentration of an additive in a carrier resin. The masterbatch composition is subsequently let down in, and blended with, another polymer at a certain percentage to give the final weight percent of the additive desired in the polyolefin composition or article of manufacture formed from the polyolefin composition.

Polyolefins can degrade during processing and over time. One type of additive is an antioxidant, which can be used to retard the degradation of a polymer. Generally, there are two basic types of antioxidants, often referred to as primary and secondary antioxidants. It is believed that primary antioxidants act as free radical scavengers and chain terminators. Primary antioxidants can be phenolic compounds. Often, a primary antioxidant (e.g., a phenolic antioxidant) is present in the polyolefin resin composition or in the article in an amount within a range from about 50 ppm to about 5000 ppm, for example, from about 100 ppm to about 2000 ppm. It is believed that secondary antioxidants act as hydroperoxide decomposers. Secondary antioxidants can be a phosphite compound. A secondary antioxidant (e.g., a phosphite antioxidant) generally is present in the polyolefin composition or in the article in an amount within a range from about 50 ppm to about 5000 ppm, or from about 500 ppm to about 2500 ppm. The following antioxidants were employed in the examples that follow:

AO-1—Irganox 1010, phenolic antioxidant, commercially available from Ciba Specialty Chemicals.

AO-2—Irgafos 168, phosphite antioxidant, commercially available from Ciba Specialty Chemicals.

AO-3—Irganox 1076, phenolic antioxidant, commercially available from Ciba Specialty Chemicals.

AO-4—TNPP, phosphite antioxidant, commercially available from Chemtura.

Polyolefin compositions and articles produced therefrom can comprise an acid scavenger (e.g., zinc oxide; calcium, zinc, or lithium stearate), which is a base that neutralizes acidic catalyst residues. Generally, the acid scavenger is present at an amount in the range from about 25 ppm to about 2000 ppm. For example, the acid scavenger can be present in an amount ranging from about 100 ppm to about 1000 ppm, or alternatively, from about 200 ppm to about 800 ppm, based on the weight of the polyolefin.

An antiblock additive is a particle (e.g., talc, $SiO_2$) that roughens the surface of a fabricated article. For instance, antiblock additives in a blown or cast film are designed to prevent adjacent film surfaces from sticking together, or blocking. Antiblocks are often present in amounts ranging from about 200 ppm to about 10,000 ppm, or from about 1000 ppm to about 8000 ppm, based on the weight of the polyolefin.

Slip additives can be amide compounds such as erucamide, stearamide, oleamide, and the like. These additives bloom to the surface of a fabricated polyolefin article and reduce the coefficient of friction (COF) of the article. Slip additives are often present in amounts ranging from about 50 ppm to about 2000 ppm, or from about 200 ppm to about 1000 ppm, based on the weight of the polyolefin.

Colorants are used to provide color or tint to a polymer composition or article, generally for aesthetic purposes. Colorant additives include the spectrum of pigments, dyes, and the like, that provide a desired color to a polymer and finished article, for example, a red colorant. These colorants also include such materials as titanium dioxide (white) and carbon black (black). Carbon black can also be employed as a filler. The following color concentrates (or masterbatches) were evaluated in the examples that follow:

COLOR-1—commercially available from Chevron Phillips Chemical Company LP as Marlex® M358Y3, an inorganic yellow pigment present at a 2% loading in a medium density polyethylene carrier resin having a melt index of 0.2 g/10 min and a density of 0.938 g/cm³.

COLOR-2—an experimental concentrate, containing an organic yellow pigment present at a 2% loading in a medium density polyethylene carrier resin having a melt index of 0.2 g/10 min and a density of 0.938 g/cm³.

COLOR-3—commercially available from PolyOne as PEC2107, a proprietary carbon black concentrate.

A filler can be employed in the polymer compositions and articles of the present invention. Suitable fillers include, but are not limited to, calcium carbonate, silicates, glass fibers, fly ash, kaolin, mica, barium sulfate, metal oxides and hydroxides, carbon black, graphite, and the like, or combinations thereof. The filler material can be coated with a compatibilizer, surfactant, or other substance to improve the compatibility with and/or dispersibility within the polymer matrix. When present, fillers are often employed at higher loadings than many other additives. For instance, a filler such as calcium carbonate can be present in the polyolefin composition and article produced therefrom in a range from about 1 to about 35 percent by weight based on the total weight of the composition or article and the filler.

Other additives can also be employed in this invention and combined with the polyolefin composition. These include, but are not limited to, antifogging agents, antimicrobial agents, antistatic agents, blowing agents, coupling agents, flame retardants, fragrances, heat stabilizers, lubricants, mold release agents, optical brighteners, plasticizers, tackifiers, and the like, or combinations thereof.

Preparation of the Polyolefin Composition

Methods for preparing polyolefin compositions are also provided in the present invention. For instance, a method for preparing a polyolefin composition can comprise combining:

(i) a polyolefin having a weight-average molecular weight (Mw) from about 175,000 to about 500,000 and a polydispersity index (Mw/Mn) from about 5 to about 40;

(ii) about 200 to about 1500 ppm of a polymer processing aid (PPA); and (iii) about 500 to about 3000 ppm of an oligomeric hindered amine light stabilizer (HALS) having the following structure:

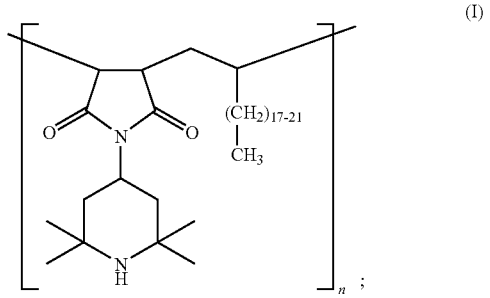

(I)

wherein n is an integer such that the oligomeric HALS has a number-average molecular weight (Mn) in a range from about 3000 to about 4000, to form the polyolefin composition.

Any of the additives discussed herein can be combined with the polyolefin resin component according to any suitable method, and at any time after formation of the polyolefin component in a polymerization process, and prior to, during, or after fabrication into an article of manufacture. While additives are typically incorporated into polymers prior to fabrication of the finished article, it is also possible to apply additives by a topical application to the finished article. Exemplary methods of combining the additives with the polyolefin resin component include, but are not limited to, blending, mixing, pelletizing, extruding, and the like, or combinations thereof. The additives can be pre-blended together and then combined with the polyolefin component, or the additives can be combined individually with the polyolefin component. The additives may be in solid form, in solution, or in a slurry. The polyolefin component can be in any form including, for example, fluff, powder, granulate, pellet, solution, slurry, emulsion, and the like. For instance, some additives can be combined with the polyolefin after polymerization, but prior to pelletizing of the polyolefin resin, such as in a pelletizing extruder. Alternatively, some additives can be incorporated by the addition of a masterbatch with the polyolefin resin into an extruder, where the components are melted and/or mixed and are subsequently converted into an article of manufacture. The present invention is not limited to any particular method of forming the polyolefin compositions disclosed herein.

Articles of Manufacture and their Preparation

Polyolefin compositions of the present invention can be used to produce or fabricate various articles of manufacture. Such articles include, but not limited to, agricultural films, automobile parts, bottles, drums, fibers and fabrics, food packaging films and containers, food service articles, fuel tanks, geomembranes, household containers, liners, molded products, medical devices and materials, pipes, sheets or tapes, toys, and the like. Generally, these articles of manufacture have either no melt fracture or substantially no melt fracture.

Methods for producing articles of manufacture from polyolefin compositions are also provided in the present invention. One such method for producing an article from a polyolefin composition comprises:

(a) providing a polyolefin composition comprising:
(i) a polyolefin having a weight-average molecular weight (Mw) from about 175,000 to about 500,000 and a polydispersity index (Mw/Mn) from about 5 to about 40;
(ii) about 200 to about 1500 ppm of a polymer processing aid (PPA); and
(iii) about 500 to about 3000 ppm of an oligomeric hindered amine light stabilizer (HALS) having the following structure:

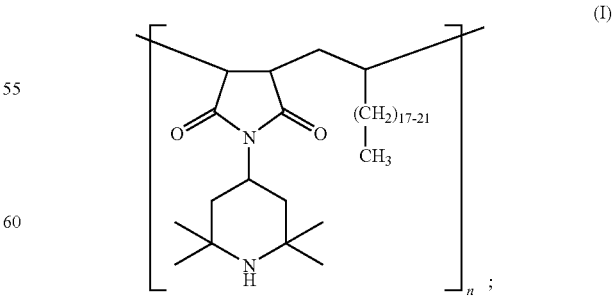

(I)

wherein n is an integer such that the oligomeric HALS has a number-average molecular weight (Mn) in a range from about 3000 to about 4000; and (b) melt processing the polyolefin composition through a die at a shear rate of less than about 50 sec$^{-1}$ to produce the article.

According to another aspect of this invention, a method for producing an article from a polyolefin composition comprises:
(a) providing a polyolefin composition comprising:
(i) a polyolefin having a weight-average molecular weight (Mw) from about 175,000 to about 500,000 and a polydispersity index (Mw/Mn) from about 5 to about 40; and
(ii) about 500 to about 3000 ppm of an oligomeric hindered amine light stabilizer (HALS) having the following structure:

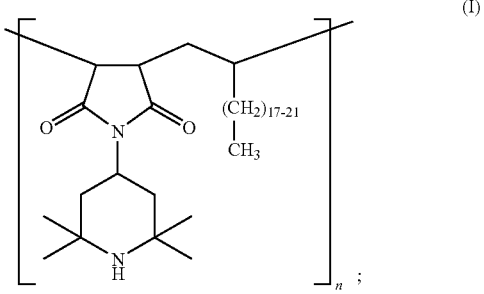

wherein n is an integer such that the oligomeric HALS has a number-average molecular weight (Mn) in a range from about 3000 to about 4000; and
(b) melt processing the polyolefin composition through a die at a shear rate of less than about 50 sec$^{-1}$ to produce the article. This method does not require the presence of a polymer processing aid (PPA).

Both of these methods can reduce melt fracture during the melt processing of the polyolefin. Further, these methods can substantially eliminate, or in other aspects, completely eliminate melt fracture during the melt processing of the polyolefin resin. In another aspect, these methods decrease the time to eliminate melt fracture during the melt processing of the polyolefin, as compared to the time needed to eliminate melt fracture in compositions which do not contain the HALS of formula (I), or the HALS of formula (I) with a PPA additive.

Various articles of manufacture, which are listed above, can be produced using these methods. In one aspect, the article is a film product. In another aspect, the article is a molded product. In yet another aspect, the article is a pipe. In still another aspect, the article is a tape or a sheet.

The aforementioned methods for producing an article from a polyolefin composition involve melt processing through a die at a shear rate of less than about 50 sec$^{-1}$. Alternatively, polyolefin compositions can be melt processed at a shear rate in a range from about 0.1 sec$^{-1}$ to about 40 sec$^{-1}$, such as, for example, a shear rate in a range from about 1 sec$^{-1}$ to about 30 sec$^{-1}$, or a shear rate in a range from about 1 sec$^{-1}$ to about 25 sec$^{-1}$. In another aspect, polyolefin compositions are melt processed at a shear rate in a range from about 1 sec$^{-1}$ to about 20 sec$^{-1}$, or in a range from about 1 sec$^{-1}$ to about 10 sec$^{-1}$. Yet, in another aspect, the polyolefin composition is melt processed through a die at a shear rate of less than about 10 sec$^{-1}$.

Although these methods of melt processing often utilize extrusion as the process to produce articles from the polyolefin composition, the present invention is not so limited. Any suitable means of melt processing can be employed and will benefit from the teachings disclosed herein. The varied articles of manufacture mentioned above can be produced using various processes, and for example, the processes can comprise a melt processing operation such as extrusion. It is contemplated that melt processing techniques such as blow molding, injection molding, rotomolding, pipe extrusion, blown film extrusion, cast film extrusion, tape or sheet extrusion, extrusion coating, profile extrusion, and the like, can be employed in the present invention. Thermoforming can also be used to achieve the desired shape of an article.

Single layer or multilayer articles can be produced using the polyolefin compositions. Multilayer articles can be formed by any process known to affix similar or dissimilar polymer layers together, including combinations of two or more different processes. For example, coextrusion through a multilayer die can be used to produce a multilayer article. Lamination and coating processes can also be used to produce structures or articles having multiple layers. Additionally, further steps can be employed to convert a multilayer polymer structure into a multilayer finished article of manufacture, such as, for example, the process of thermoforming.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cm$^3$) on a compression molded sample, cooled at about 15° C. per hour, and conditioned for about 40 hours at room temperature in accordance with ASTM D1505 and ASTM D1928, procedure C.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—η$_0$, characteristic viscous relaxation time—τ$_η$, and the breadth parameter—α. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
|η*(ω)|=magnitude of complex shear viscosity;
η$_0$=zero shear viscosity;
τ$_η$=viscous relaxation time;
α="breadth" parameter;
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, *Fluid Mechanics*, 2nd Edition, John Wiley & Sons (1987); each of which is incorporated herein by reference in its entirety.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 µL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8×300 mm) and were calibrated with a broad linear polyethylene standard for which the molecular weight had been determined. The following abbreviations are used: Mn is the number-average molecular weight; Mw is the weight-average molecular weight; and PDI is the polydispersity index, determined by the ratio Mw/Mn, a measure of molecular weight distribution.

Example 1

The Effect of Additive Packages on Shear Stress Reduction Using a Capillary Rheometer The effects of temperature, HALS additive, and shear rate on shear stress reduction in a capillary rheometer were evaluated in Example 1. RESIN-1 was used in Example 1 and contained 1000 ppm AO-1, 1500 ppm AO-2, and 500 ppm calcium stearate. HALS-1, HALS-2, and HALS-3 were added to RESIN-1 via a 10% masterbatch to a final loading of 2000 ppm. PPA-1 was added to RESIN-1 via a 3% masterbatch to a final loading of 500 ppm. The carrier resin for these masterbatches was a metallocene LLDPE.

Figure 2:
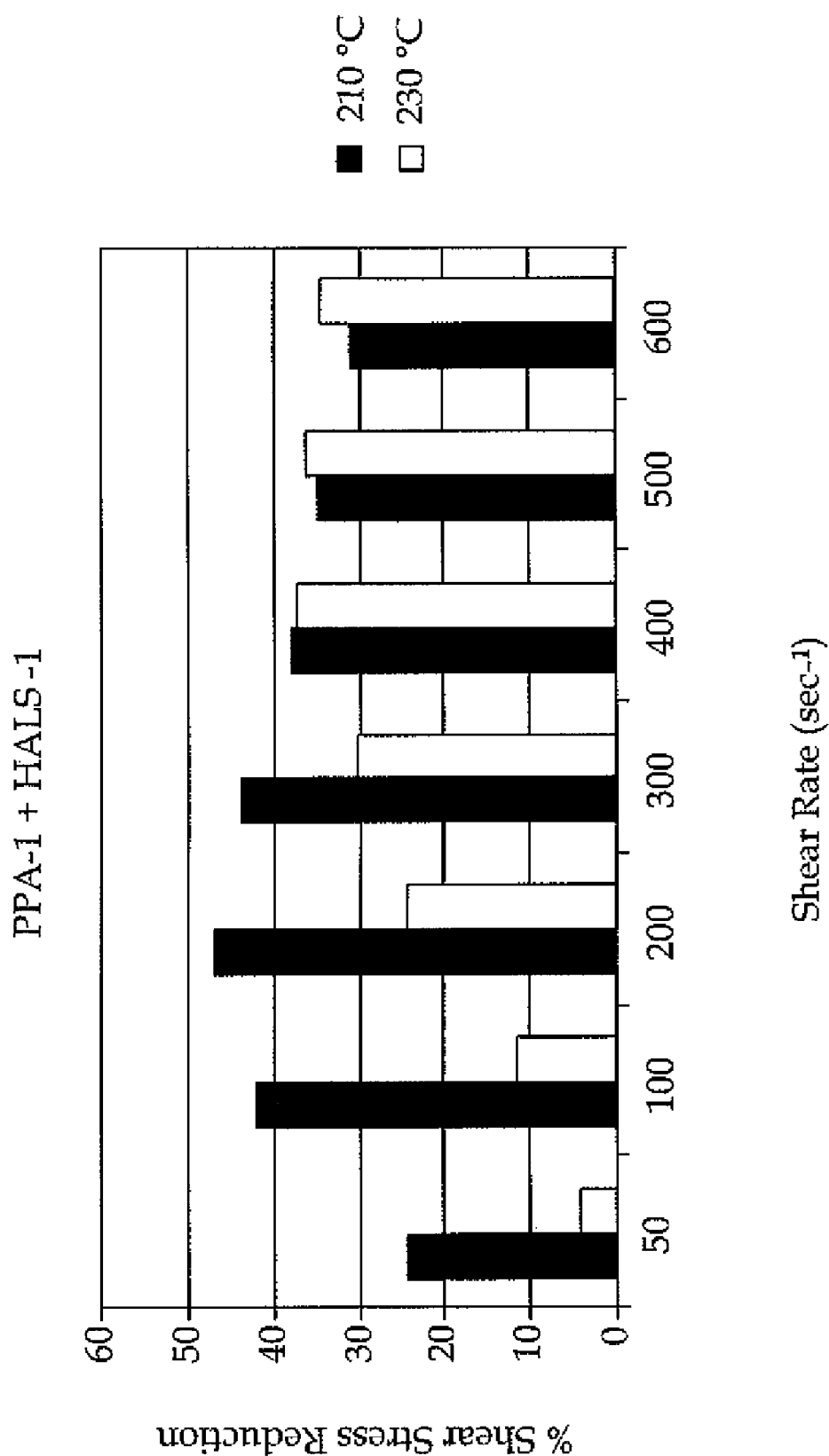
FIG. 2 presents a plot of shear stress reduction due to the addition of PPA-1 and HALS-1 as a function of shear rate and temperature for RESIN-1.
Figure 3:
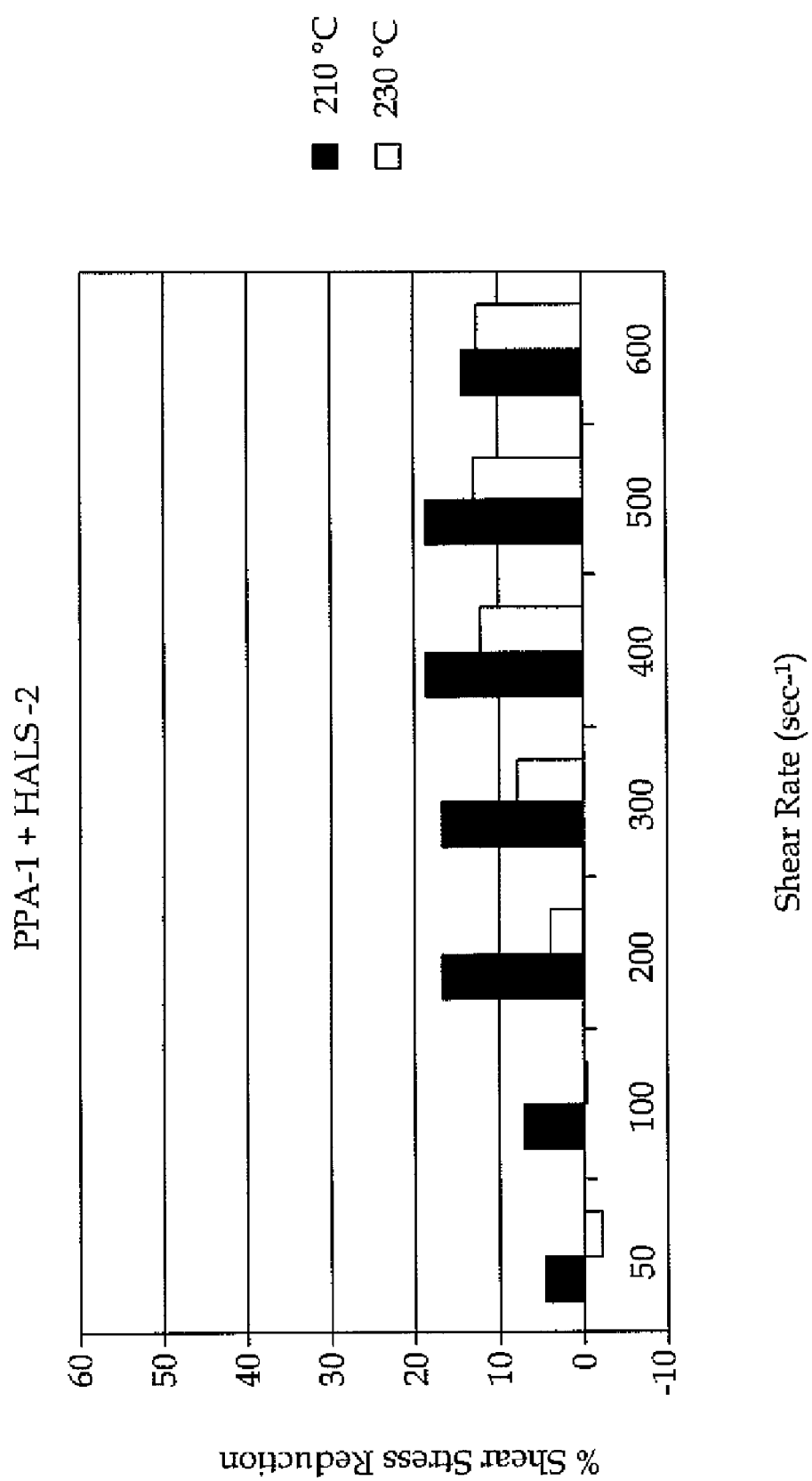
FIG. 3 presents a plot of shear stress reduction due to the addition of PPA-1 and HALS-2 as a function of shear rate and temperature for RESIN-1.
Figure 4:
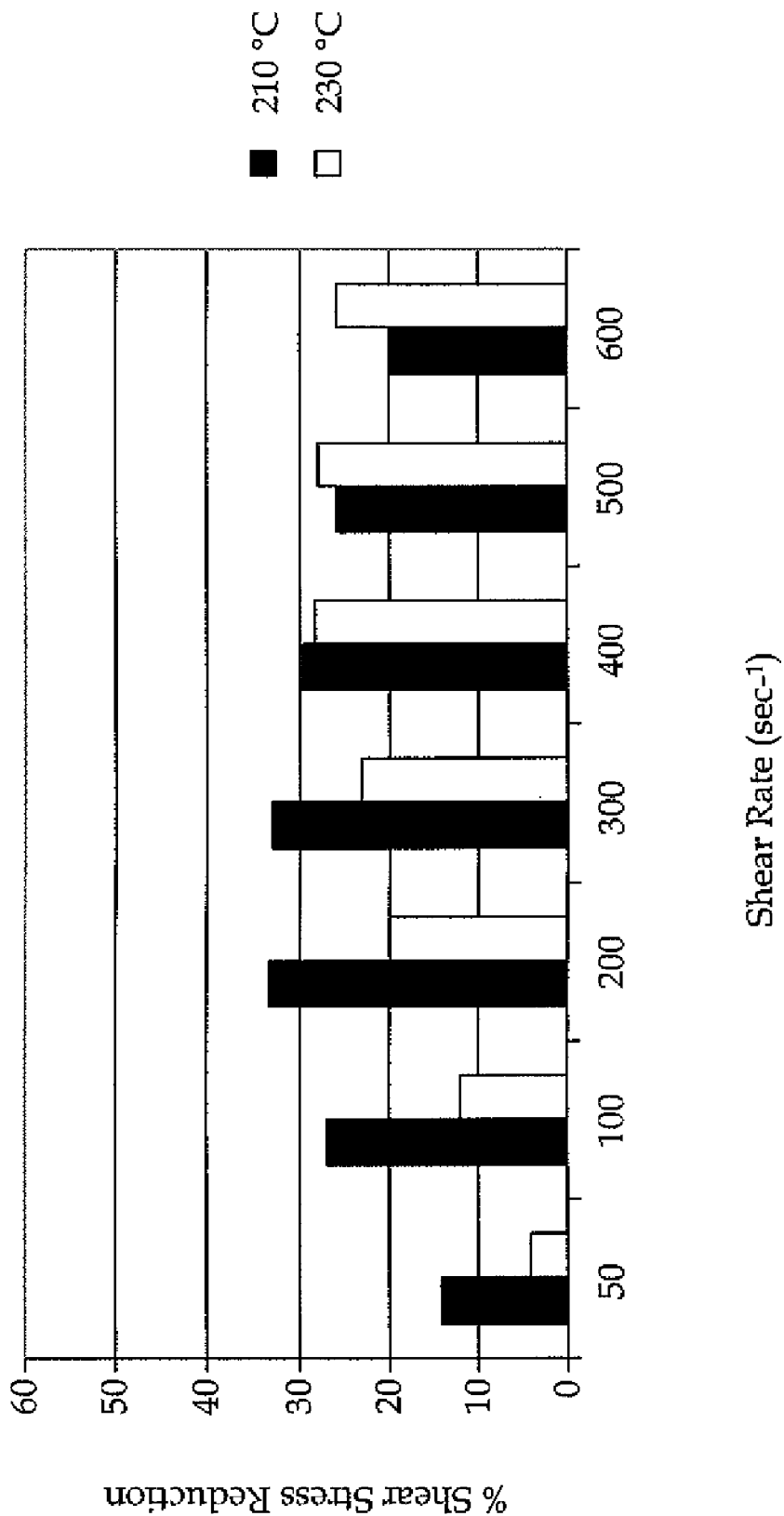
FIG. 4 presents a plot of shear stress reduction due to the addition of PPA-1 and HALS-3 as a function of shear rate and temperature for RESIN-1.

FIGS. 1-4 illustrate the shear stress reduction over a shear rate range from 50 to 600 $sec^{-1}$ and at temperatures of 210° C. and 230° C. In determining the shear stress reduction, the control was RESIN-1 without any HALS or PPA additives. For example, FIG. 1 demonstrates the shear stress reduction via the addition of 500 ppm of PPA-1 as compared to RESIN-1 without any processing aid. Similarly, FIGS. 2-4 illustrate the shear stress reduction using PPA-1 in combination with HALS-1, HALS-2, and HALS-3, respectively. Higher percentages of shear stress reduction generally correlate with a greater likelihood of melt fracture elimination. As demonstrated by comparing FIGS. 2-4 with FIG. 1, the addition of HALS additives reduces the shear stress reduction and, therefore, would be expected to increase the severity of melt fracture.

Example 2

The Effect of Additive Packages on Melt Fracture Elimination in Blown Film

The effects of temperature, HALS additive, and shear rate on melt fracture elimination in blown film were evaluated in Example 2. RESIN-2 was used in Example 2 and contained 800 ppm AO-3, 1600 ppm AO-4, and 400 ppm zinc oxide. HALS-1, HALS-2, and HALS-3 were added to RESIN-2 via a 10% masterbatch to a final loading of 2000 ppm. PPA-1 was added to RESIN-2 via a 3% masterbatch to a final loading of 500 ppm. 4000 ppm of an antiblock additive (Optibloc 10) were also added via a 50% masterbatch. The carrier resin for these masterbatches was a LLDPE. RESIN-2 with the respective additive packages was extruded through a blown film die at a melt temperature of either 193° C. or 232° C.

Figure 5:
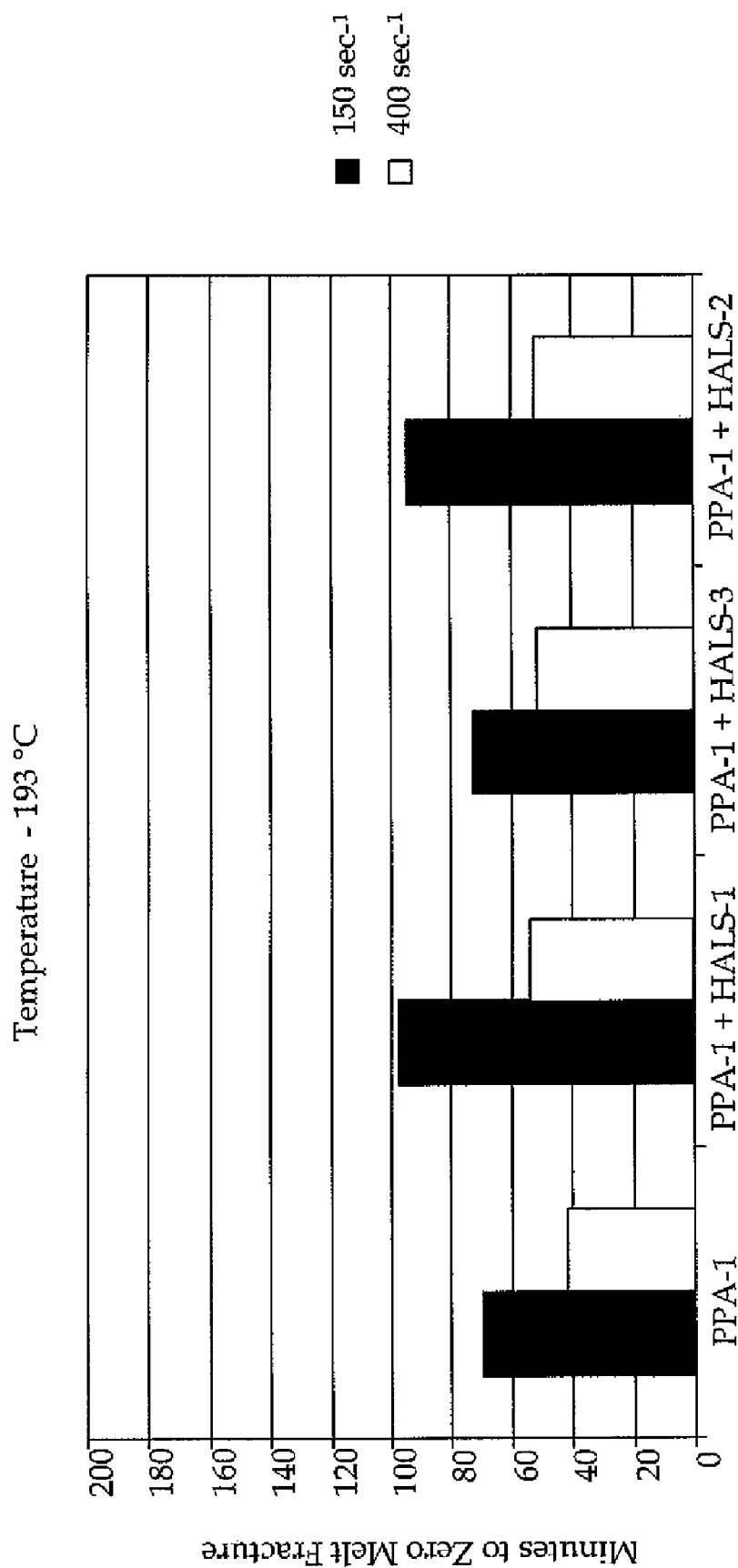
FIG. 5 presents a plot of the time to eliminate melt fracture at 193° C. as a function of shear rate for the addition of PPA-1, PPA-1 and HALS-1, PPA-1 and HALS-2, and PPA-1 and HALS-3, to RESIN-2.
Figure 6:
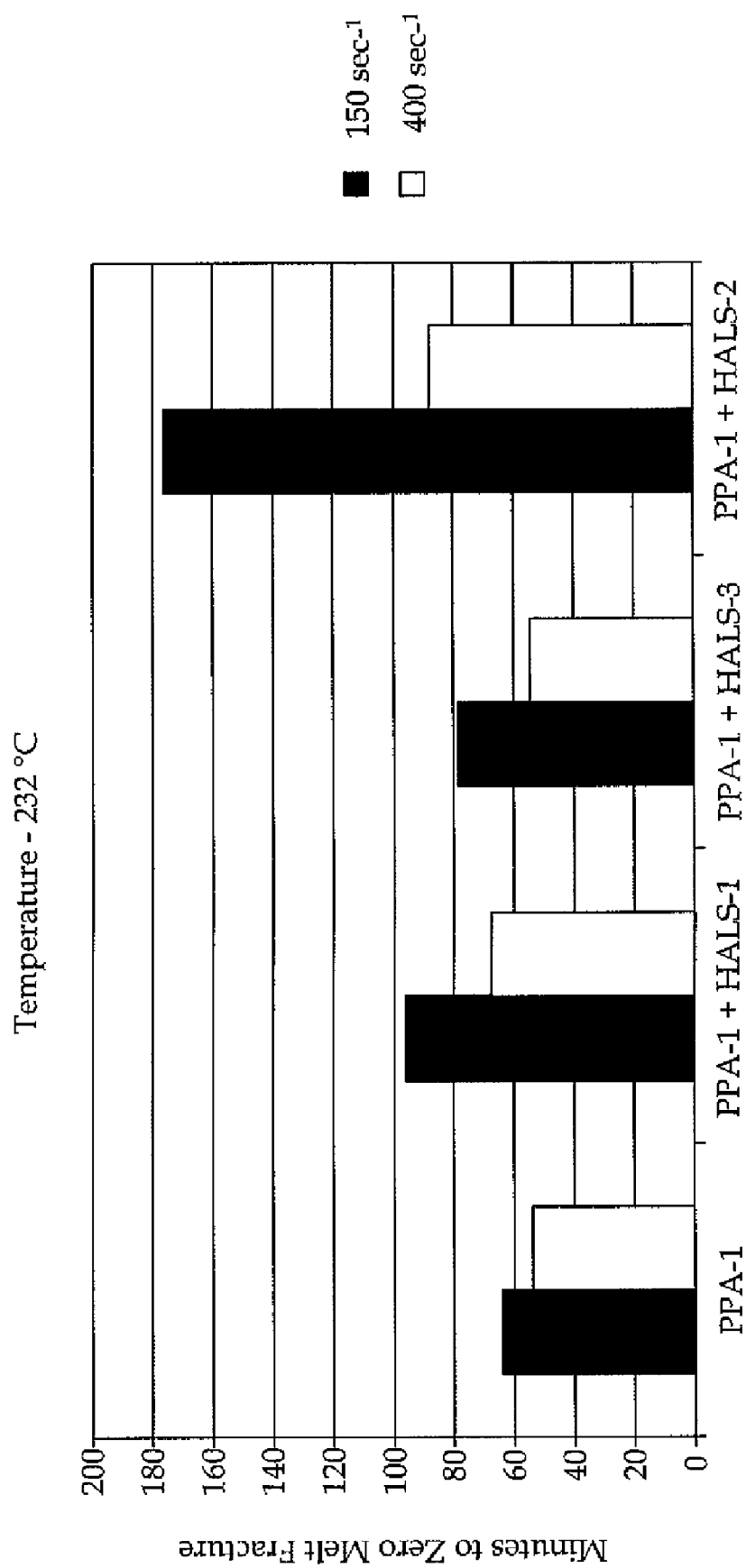
FIG. 6 presents a plot of the time to eliminate melt fracture at 232° C. as a function of shear rate for the addition of PPA-1, PPA-1 and HALS-1, PPA-1 and HALS-2, and PPA-1 and HALS-3, to RESIN-2.

FIGS. 5-6 illustrate the time to eliminate melt fracture over a shear rate range from 150 to 400 $sec^{-1}$ and at temperatures of 193° C. and 232° C. Using visual observation, the time to eliminate melt fracture was recorded for RESIN-2 with PPA-1, with PPA-1 and HALS-1, with PPA-1 and HALS-2, and with PPA-1 and HALS-3, respectively. The additives packages containing PPA-1 and either HALS-1 or HALS-2 show the expected negative interaction between a PPA and a HALS additive; that is, when a HALS additive is present, it takes more time to eliminate melt fracture than when PPA is used alone. Generally, the negative impact of the HALS additive on melt fracture was increased as shear rate decreased or as temperature increased.

Interestingly, HALS-3 did not exhibit a strong negative interaction with PPA-1. At the shear rate and temperature conditions employed in Example 2, PPA-1 and HALS-3 provided times to eliminate melt fracture that were roughly equivalent to those of PPA-1 alone.

Example 3

The Effect of Additive Packages on Melt Fracture Elimination in a Pipe Die

The effect of HALS additive on melt fracture elimination in pipe extrusion was evaluated in Example 3. RESIN-3 was used in Example 3 and contained 2000 ppm AO-1, 2000 ppm AO-2, and 400 ppm calcium stearate. HALS-1, HALS-3, and HALS-4 were added to RESIN-3 via a 5% masterbatch to a final loading of 1500 to 3000 ppm. PPA-2 was added to RESIN-3 via a 5% masterbatch to a final loading of 400 ppm. The carrier resin for these masterbatches was RESIN-3. RESIN-3 with the respective additive packages was melt processed at 230° C. through a ¾-inch diameter, 25:1 length/diameter extruder with a 12-inch long, annular pipe die having a ⅜-inch diameter. The shear rate in the die was approximately 2 $sec^{-1}$.

Using visual observation, the degree or severity of melt fracture was evaluated. It should be noted that the time to clear melt fracture in pipe extrusion at low shear rate is generally longer than would be experienced in blown film, extruded through an annular die at much higher shear rates. Table I summarizes the PPA and HALS additives employed in Example 3 and provides comments concerning their melt fracture behavior. Example 3A, which contained 400 ppm PPA and no HALS, still had melt fracture after 6 hours of extrusion. Example 3B, which contained HALS-1, had worse melt fracture after a longer period of extrusion. Example 3C contained HALS-4 and also exhibited a negative interaction with PPA, but the antagonistic interaction was not as severe as that of Example 3B. Surprisingly, the formulation of Example 3D containing 1500 PPA HALS-3 had less melt fracture than Example 3A in a shorter time period, and was free of melt fracture after 6 hours. Additionally, when the HALS-3 loading was increased (Example 3E), melt fracture cleared up in only 2.5 hours. Use of HALS-3 in combination with PPA-2 eliminated melt fracture faster than the use of PPA-2 alone.

TABLE I

Summary of Examples 3A-3E.

| Example | PPA-2 | HALS-1 | HALS-4 | HALS-3 | COMMENTS |
|---|---|---|---|---|---|
| 3A | 400 ppm | — | — | — | Melt fracture still remains after 6 hours of extrusion |
| 3B | 400 ppm | 1500 ppm | — | — | After 7 hours, slightly more melt fracture was present than in 3A |

TABLE I-continued

Summary of Examples 3A-3E.

| Example | PPA-2 | HALS-1 | HALS-4 | HALS-3 | COMMENTS |
|---------|-------|--------|--------|--------|----------|
| 3C | 400 ppm | — | 1500 ppm | — | After 7 hours, the melt fracture was less than in 3B but more than in 3A |
| 3D | 400 ppm | — | — | 1500 ppm | Less melt fracture than in 3A after 4.6 hrs; no melt fracture after 6 hours |
| 3E | 400 ppm | — | — | 3000 ppm | Melt fracture eliminated after 2.5 hours |

Example 4

The Effect of HALS Additive on Melt Fracture Elimination in a Tape Die

The effect of the selection of the HALS additive on melt fracture elimination in tape extrusion was evaluated in Example 4. RESIN-4 was used in Example 4 and contained 2000 ppm AO-1, 2000 ppm AO-2, 400 ppm calcium stearate, and 300 ppm lithium stearate. HALS-1, HALS-3, HALS-5, HALS-6, and HALS-7, respectively, were added to directly to RESIN-4 before pelletizing to a final loading of 1500 ppm. PPA-2 was added to directly to RESIN-4 before pelletizing to a final loading of 900 ppm. RESIN-4 with the respective additive packages was extruded at 175° C. through a slot/tape die. The shear rate in the die was approximately 5 sec$^{-1}$. These experiments were conducted on a 1-inch diameter single-screw Killion KL-100 extruder, fitted with a barrier screw with a Maddock mixing section. A tape die was fitted at the end of the extruder and the tape die was 1.25 inches wide with a die gap of 0.115 inches (2.92 mm). The extruder temperature profile was 180° C./240° C./220° C./200° C. for feed Zone 1, and barrel Zone 2, Zone 3, and Zone 4 (exit), respectively, and the tape die temperature was 175° C. The screw speed was 20 rpm, and yielded flow rates of about 10 g/min.

Using visual observation, the degree or severity of melt fracture was evaluated after 2 hours of extrusion. Table II summarizes the PPA and HALS additives employed in Example 4, provides comments concerning their melt fracture behavior, and a rating of the severity of melt fracture. The rating scale in Table II was based on the percent of the cross-sectional surface area of the tape extrudate having sharkskin melt fracture. For tape samples with 80% or more of the surface area exhibiting melt fracture, the rating was 4 (worst). A rating of 3 signified that between 30% and 80% of the surface area exhibited melt fracture, while a rating of 2 indicated that between 1% and 30% of the surface area contained melt fracture. To achieve a rating of 1 (best), no melt fracture was present.

Example 4A contained PPA and no HALS additive and served as a control. Examples 4B-4E all showed the expected antagonistic interaction between PPA and HALS. Specifically, it was more difficult to eliminate melt fracture using a PPA when one of HALS-1, HALS-5, HALS-6, or HALS-7 was also present. In contrast, HALS-3 exhibited a synergistic interaction with PPA-2; melt fracture was improved over that found when using PPA-2 alone. In the case of Example 4F, melt fracture was eliminated within 2 hours of extrusion.

TABLE II

Effect of different HALS additive on melt fracture.

| Example | 900 ppm PPA | 1500 ppm HALS | Melt Fracture Observations After 2 Hours | Rating (1 = best, 4 = worst) |
|---------|-------------|---------------|------------------------------------------|------------------------------|
| 4A | PPA-2 | N/A | Very slight melt fracture across web; edges were smooth | 2.5 |
| 4B | PPA-2 | HALS-5 | Slight melt fracture across web and on sides | 3.0 |
| 4C | PPA-2 | HALS-6 | Slight melt fracture across web and on sides | 3.0 |
| 4D | PPA-2 | HALS-1 | Slight melt fracture across web and on sides | 3.0 |
| 4E | PPA-2 | HALS-7 | Slight melt fracture across web and on sides | 3.0 |
| 4F | PPA-2 | HALS-3 | Smooth web; edges were smooth | 1.0 |

Example 5

The Effect of PPA Additive on Melt Fracture Elimination in a Tape Die

The effect of the selection of the PPA additive on melt fracture elimination in tape extrusion was evaluated in Example 5. RESIN-4 was used in Example 5. HALS-3 was added directly to RESIN-4 before pelletizing to a final loading of 1500 ppm. PPA-2, PPA-3, PPA-4, and PPA-5, respectively, were added directly to RESIN-4 before pelletizing to a final loading of 900 ppm. RESIN-4 with the respective additive packages was extruded at 175° C. through a slot die at a shear rate of approximately 5 sec$^{-1}$, in the manner described in Example 4.

Using visual observation, the degree or severity of melt fracture was evaluated after 2 hours of extrusion. Table III summarizes the PPA and HALS additives employed in Example 5, provides comments concerning their melt fracture behavior, and a rating of the severity of melt fracture. The rating scale in Table III was the same as that described in Example 4 above. Example 5A contained PPA-2 and no HALS additive and served as a control. In contrast to the expected negative interaction between PPA and HALS, each of Examples 5B-5E actually showed an improvement in melt fracture elimination over the use of a PPA alone, when the HALS additive used was HALS-3.

TABLE III

Effect of different PPA additives on melt fracture.

| Examples | 900 ppm PPA | 1500 ppm HALS | Melt Fracture Observations After 2 Hours | Rating (1 = best, 4 = worst) |
|----------|-------------|---------------|------------------------------------------|------------------------------|
| 5A | PPA-2 | N/A | Very slight melt fracture across web; edges were smooth | 2.5 |
| 5B | PPA-3 | HALS-3 | Smooth web; edges were smooth | 1.0 |
| 5C | PPA-4 | HALS-3 | Slight melt fracture across web | 2.0 |
| 5D | PPA-2 | HALS-3 | Smooth web; edges were smooth | 1.0 |
| 5E | PPA-5 | HALS-3 | Smooth web; edges were smooth | 1.0 |

Example 6

The Effect of the Addition of a Colorant on Melt Fracture Elimination in a Tape Die The effect of the addition of colorants on melt fracture elimination in tape extrusion was evaluated in Example 6. RESIN-4 was used in Example 6. HALS-3 was added directly to RESIN-4 before pelletizing to a final loading of 1500 ppm.

PPA-2 was added directly to RESIN-4 before pelletizing to a final loading of 900 ppm. COLOR-1, COLOR-2, and COLOR-3, respectively, were added to RESIN-4 via masterbatches as dry blends at 2 weight % for COLOR-1, 2 weight % for COLOR-2, and 6.25 weight % for COLOR-3. RESIN-4 with the respective additive packages was extruded at 175° C. through a tape/slot die at a shear rate of approximately 5 sec$^{-1}$, in the manner described in Example 4.

Using visual observation, the degree or severity of melt fracture was evaluated after 2 hours of extrusion. Table IV summarizes the color concentrate additives employed in Example 6, provides comments concerning their melt fracture behavior, and a rating of the severity of melt fracture. The rating scale in Table IV was the same as that described in Example 4 above. Example 6A contained 900 ppm PPA-2 and 1500 ppm HALS-3, but no colorant, and served as a control. As evidenced by Examples 6B-6D, the addition of color concentrates did not negatively impact the synergistic effect of using HALS-3 in combination with a PPA to eliminate melt fracture.

TABLE IV

Effect of colorant additives on melt fracture.

| Example | Color | Melt Fracture Observations After 2 Hours | Rating (1 = best, 4 = worst) |
|---|---|---|---|
| 6A | No Color | Smooth web; edges were smooth | 1.0 |
| 6B | COLOR-1 | Smooth web; edges were smooth | 1.0 |
| 6C | COLOR-2 | Smooth web; edges were smooth | 1.0 |
| 6D | COLOR-3 | Smooth web; edges were smooth | 1.0 |

Example 7

The Effect of PPA and HALS Loading on Melt Fracture Elimination in a Tape Die

The effect of the ppm loadings of PPA and HALS on melt fracture elimination in tape extrusion was evaluated in Example 7. RESIN-4 was used in Example 7. HALS-3 was added directly to RESIN-4 before pelletizing to a final loading of either 1000 ppm or 2000 ppm. PPA-2 was added directly to RESIN-4 before pelletizing to a final loading of either 750 ppm or 1500 ppm. RESIN-4 with the respective additive packages was extruded at 175° C. through a slot die at a shear rate of approximately 5 sec$^{-1}$, in the manner described in Example 4.

Figure 7:
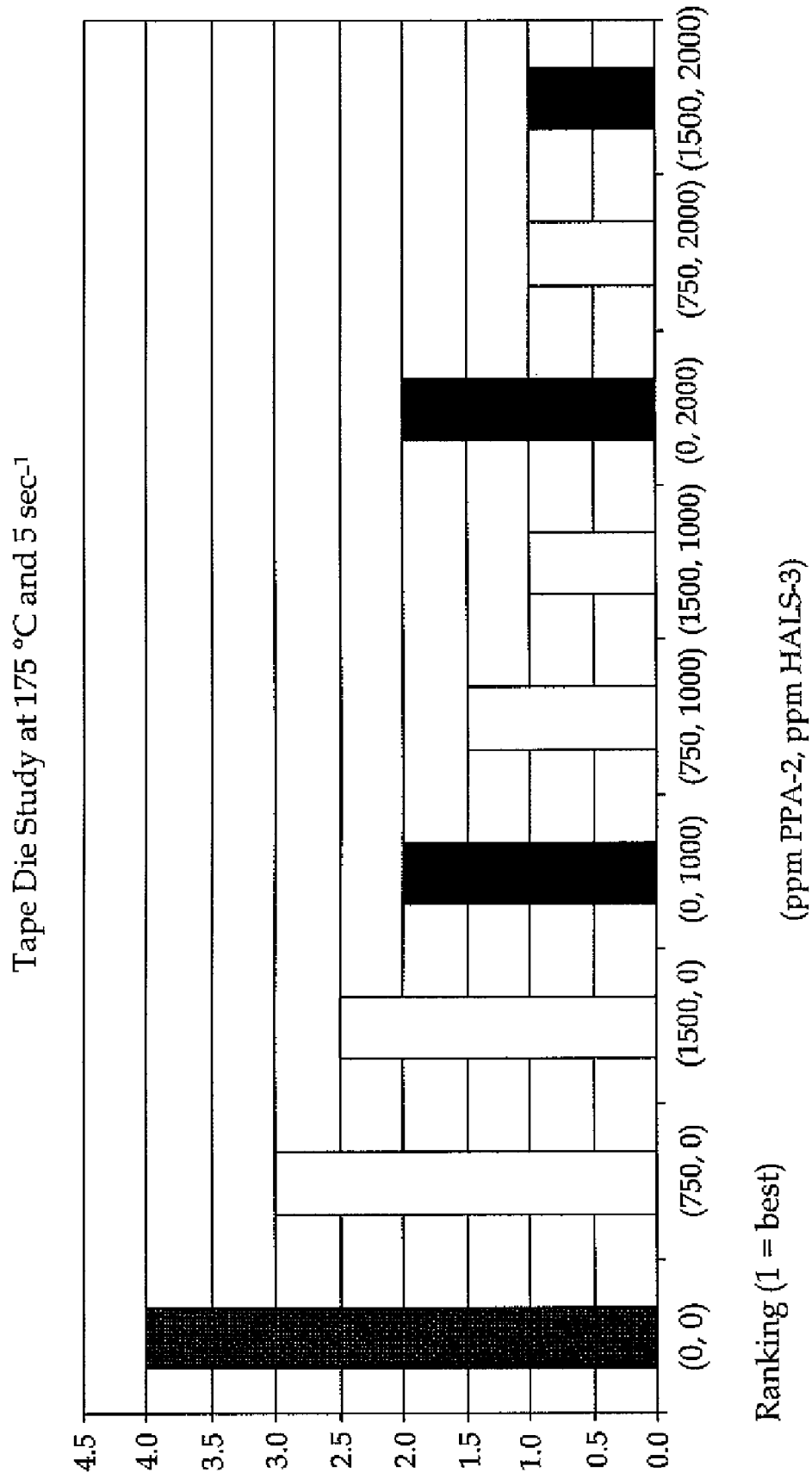
FIG. 7 presents a plot summarizing the melt fracture results of various combinations of PPA-2 and HALS-3 employed in Example 7 as additives in RESIN-4.

Using visual observation, the degree or severity of melt fracture was evaluated after 2 hours of extrusion. Table V summarizes the various combinations of PPA-2 and HALS-3 employed in Example 7, provides comments concerning their melt fracture behavior, and a rating of the severity of melt fracture. The rating scale in Table V was the same as that described in Example 4 above. Example 7A contained no PPA and HALS additive and exhibited severe melt fracture. Examples 7B-7C illustrated the impact on melt fracture of using PPA-2, in the absence of a HALS additive. At a PPA-2 loading of 750 ppm, the addition of either 1000 ppm or 2000 ppm HALS-3 resulted in a significant and unexpected improvement in melt fracture; see Examples 7B, 7E, and 7H. Similar beneficial results with the addition of HALS-3 were seen in the experiments using 1500 ppm PPA-2, as reflected in Examples 7C, 7F, and 7I. Synergistic results were obtained and are demonstrated, for instance, by Example 7H, when compared to melt fracture performance of Examples 7B and 7G. FIG. 7 illustrates in graphical form the results of Example 7, which are listed in Table V.

HALS-3 also reduced melt fracture, rather unexpectedly, even when no PPA was present. This is shown in both FIG. 7 and Table V by Examples 7D and 7G, which contain no PPA, but contain either 1000 or 2000 ppm HALS-3. Interestingly, by comparing Example 7D with Example 7C, it appeared that the HALS-3 additive was more effective in reducing melt fracture than PPA-2.

TABLE V

Effect of PPA and HALS loadings on melt fracture.

| Example | PPA-2 (ppm) | HALS-3 (ppm) | Melt Fracture Observations After 2 Hours | Rating |
|---|---|---|---|---|
| 7A | 0 | 0 | Web and edge melt fracture present | 4.0 |
| 7B | 750 | 0 | Slight melt fracture across the web | 3.0 |
| 7C | 1500 | 0 | Some melt fracture across web; more melt fracture on edges | 2.5 |
| 7D | 0 | 1000 | Melt fracture across web; slight melt fracture on edges | 2.0 |
| 7E | 750 | 1000 | Smooth across web and edges | 1.5 |
| 7F | 1500 | 1000 | Smooth across web; very smooth edges | 1.0 |
| 7G | 0 | 2000 | Slight melt fracture across web; smooth edges | 2.0 |
| 7H | 750 | 2000 | Smooth across web; very smooth edges | 1.0 |
| 7I | 1500 | 2000 | Edge melt fracture at start; smooth after 30 min and at 2 hours | 1.0 |

Example 8

Larger Scale Evaluation of PPA-2 and HALS-3 in a Pipe Die

RESIN-4 and a larger scale pipe extrusion line were employed for Example 8. First, RESIN-4 flake (fluff or powder) was pelletized on a ZSK 58 mm twin-screw extruder with the following additives and respective concentrations: 2000 ppm AO-1, 2000 ppm of AO-2, 400 ppm of calcium stearate, 900 ppm of PPA-2, and 1600 ppm of HALS-3. Additionally, a small amount of a proprietary tracer compound also was added to the formulation. RESIN-4 with the aforementioned additive package was dry blended with COLOR-1 (yellow masterbatch) at the extruder feed, and converted into pipe. The pipe extrusion line consisted of a 4.5-inch Davis Standard extruder, length/diameter of 30, and medium shear screw with a Maddock mixing tip. The extruder was fitted with a annular pipe die and the die gap was 0.902 inches (22.9 mm). The temperature profile of the six-zone extruder increased from 176° C. at Zone-1 (feed) to 215° C. at Zone-6 (exit). Similarly, the temperature profile of the six-zone die increased from 176° C. (at the end of the extruder) to 215° C. (at the exit of the die), with the die tip set at 232° C. The output rate was 875 lb/hr using a screw speed of 70 rpm, resulting in an apparent shear rate of approximately 2 sec$^{-1}$.

The melt fracture present on the pipe extrudate was assessed visually, and was readily apparent during the first 1 hour of extrusion. However, after approximately 4 hours of continuous extrusion, the sharkskin melt fracture was completely eliminated.

I claim:
1. A polyolefin composition comprising:
(i) a polyolefin having a weight-average molecular weight (Mw) from about 175,000 to about 500,000 and a polydispersity index (Mw/Mn) from about 5 to about 40;
(ii) about 200 to about 1500 ppm of a polymer processing aid (PPA); and

(iii) about 500 to about 3000 ppm of an oligomeric hindered amine light stabilizer (HALS) having the following structure:

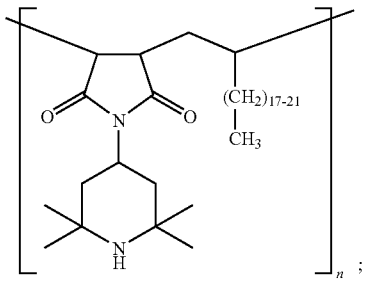

wherein n is an integer such that the oligomeric HALS has a number-average molecular weight (Mn) in a range from about 3000 to about 4000.

2. The composition of claim 1, wherein the polyolefin is an ethylene homopolymer or ethylene copolymer.

3. The composition of claim 1, wherein the melt index (MI) of the polyolefin is in a range from about 0.01 to about 0.5 g/10 min.

4. The composition of claim 1, wherein the high load melt index (HLMI) of the polyolefin is in a range from about 1 to about 10 g/10 min.

5. The composition of claim 1, wherein the density of the polyolefin is in a range from about 0.935 to about 0.955 g/cm$^3$.

6. The composition of claim 1, wherein the zero-shear viscosity of the polyolefin at 190° C. is in a range from about 50,000 to about 500,000 Pa·s.

7. The composition of claim 1, wherein there is substantially no melt fracture when the polyolefin composition is melt processed at a shear rate of less than about 50 sec$^{-1}$.

8. The composition of claim 1, wherein the polyolefin composition further comprises at least one other additive selected from an antioxidant, an acid scavenger, an antiblock additive, a slip additive, a colorant, a filler, or any combination thereof.

9. The composition of claim 1, wherein the polyolefin composition further comprises an UV absorber or a second HALS additive.

10. The composition of claim 1, wherein the PPA comprises a vinylidene fluoride-hexafluoropropylene copolymer, a difluoroethene-tetrafluoroethene-hexafluoropropylene terpolymer, a polyethylene oxide, a polyester polyol, or any combination thereof.

11. The composition of claim 10, wherein the PPA further comprises talc, calcium carbonate, or a combination thereof.

12. An article produced from the polyolefin composition of claim 1.

13. The article of claim 12, wherein the article is a pipe.

14. An article selected from a pipe and a tape, the article comprising:

(i) a polyolefin having a weight-average molecular weight (Mw) from about 175,000 to about 500,000 and a polydispersity index (Mw/Mn) from about 5 to about 40;

(ii) about 100 to about 1500 ppm of a polymer processing aid (PPA); and (iii) about 500 to about 3000 ppm of an oligomeric hindered amine light stabilizer (HALS) having the following structure:

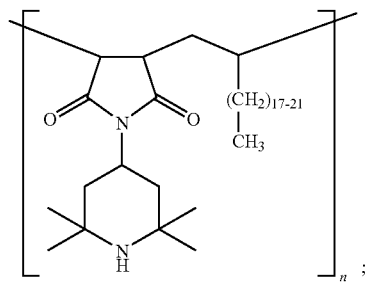

wherein n is an integer such that the oligomeric HALS has a number-average molecular weight (Mn) in a range from about 3000 to about 4000.

15. The article of claim 14, wherein the polyolefin is an ethylene homopolymer or ethylene copolymer.

16. The article of claim 14, wherein the melt index (MI) of the polyolefin is in a range from about 0.01 to about 0.5 g/10 min.

17. The article of claim 14, wherein the high load melt index (HLMI) of the polyolefin is in a range from about 1 to about 10 g/10 min.

18. The article of claim 14, wherein the density of the polyolefin is in a range from about 0.935 to about 0.955 g/cm$^3$.

19. The article of claim 14, wherein the zero-shear viscosity of the polyolefin at 190° C. is in a range from about 50,000 to about 500,000 Pa·s.

20. The article of claim 14, wherein the article has substantially no melt fracture.

21. The article of claim 14, wherein the article further comprises at least one other additive selected from an antioxidant, an acid scavenger, an antiblock additive, a slip additive, a colorant, a filler, or any combination thereof.

22. The article of claim 14, wherein the article further comprises an UV absorber or a second HALS additive.

23. The article of claim 14, wherein the PPA comprises a vinylidene fluoride-hexafluoropropylene copolymer, a difluoroethene-tetrafluoroethene-hexafluoropropylene terpolymer, a polyethylene oxide, a polyester polyol, or any combination thereof.

24. The article of claim 23, wherein the PPA further comprises talc, calcium carbonate, or a combination thereof.

25. A method for producing an article from a polyolefin composition, the method comprising:

(a) providing a polyolefin composition comprising:

(i) a polyolefin having a weight-average molecular weight (Mw) from about 175,000 to about 500,000 and a polydispersity index (Mw/Mn) from about 5 to about 40;

(ii) about 200 to about 1500 ppm of a polymer processing aid (PPA); and (iii) about 500 to about 3000 ppm of an oligomeric hindered amine light stabilizer (HALS) having the following structure:

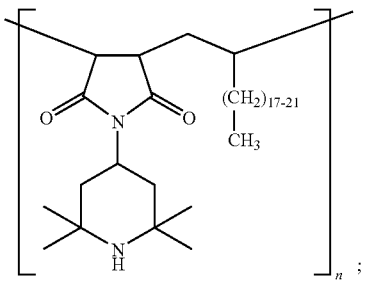

(I)

wherein n is an integer such that the oligomeric HALS has a number-average molecular weight (Mn) in a range from about 3000 to about 4000; and (b) melt processing the polyolefin composition through a die at a shear rate of less than about 50 sec$^{-1}$ to produce the article.

26. The method of claim 25, wherein the polyolefin composition is melt processed through the die at a shear rate of less than about 10 sec$^{-1}$.

27. The method of claim 25, wherein the method reduces melt fracture during the melt processing of the polyolefin.

28. The method of claim 25, wherein the method substantially eliminates melt fracture during the melt processing of the polyolefin.

29. The method of claim 25, wherein the method decreases the time to eliminate melt fracture during the melt processing of the polyolefin.

30. An article produced by the method of claim 25.

31. The article of claim 30, wherein the article is a pipe or a tape.

32. A method for producing an article from a polyolefin composition, the method comprising:

(a) providing a polyolefin composition comprising:
  (i) a polyolefin having a weight-average molecular weight (Mw) from about 175,000 to about 500,000 and a polydispersity index (Mw/Mn) from about 5 to about 40; and
  (ii) about 500 to about 3000 ppm of an oligomeric hindered amine light stabilizer (HALS) having the following structure:

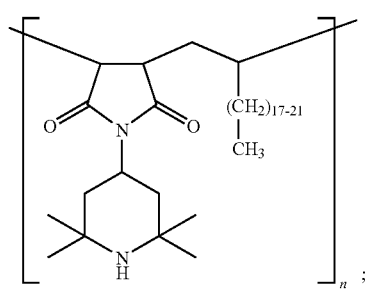

(I)

wherein n is an integer such that the oligomeric HALS has a number-average molecular weight (Mn) in a range from about 3000 to about 4000; and (b) melt processing the polyolefin composition through a die at a shear rate of less than about 50 sec$^{-1}$ to produce the article.

33. The method of claim 32, wherein the method reduces melt fracture during the melt processing of the polyolefin.

34. The method of claim 32, wherein the method substantially eliminates melt fracture during the melt processing of the polyolefin.

35. The method of claim 32, wherein the method decreases the time to eliminate melt fracture during the melt processing of the polyolefin.

* * * * *